US012580782B2

(12) United States Patent
Snow

(10) Patent No.: US 12,580,782 B2
(45) Date of Patent: *Mar. 17, 2026

(54) SYSTEMS AND METHODS FOR PROCESSING BLOCKCHAIN TRANSACTIONS

(71) Applicant: Inveniam Capital Partners, Inc., New York, NY (US)

(72) Inventor: Paul Snow, Austin, TX (US)

(73) Assignee: Inveniam Capital Partners, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/928,136

(22) Filed: Oct. 27, 2024

(65) Prior Publication Data

US 2025/0055715 A1 Feb. 13, 2025

Related U.S. Application Data

(63) Continuation of application No. 17/872,229, filed on Jul. 25, 2022, now Pat. No. 12,137,179, which is a
(Continued)

(51) Int. Cl.
*G06F 16/00* (2019.01)
*H04L 9/00* (2022.01)
(Continued)

(52) U.S. Cl.
CPC .............. *H04L 9/50* (2022.05); *H04L 9/0825* (2013.01); *H04L 9/3236* (2013.01); *H04L 9/3247* (2013.01)

(58) Field of Classification Search
CPC ... G06F 16/2255; G06F 16/27; G06F 16/9024
See application file for complete search history.

(56) References Cited

U.S. PATENT DOCUMENTS 4,309,569 A 1/1982 Merkle
5,499,294 A 3/1996 Friedman
(Continued)

FOREIGN PATENT DOCUMENTS

CN 107392618 A 11/2017
CN 110392052 A 10/2019
(Continued)

OTHER PUBLICATIONS

Al-Naji, Nader et al., "Basis: A Price-Stable Cryptocurrency with an Algorithmic Central Bank" www.basis.io Jun. 20, 2017, 27 pages.
(Continued)

*Primary Examiner* — Noosha Arjomandi
(74) *Attorney, Agent, or Firm* — Koffsky Schwalb LLC

(57) ABSTRACT

A blockchain system has an identity-based blockchain account including a primary chain, a secondary chain, and at least one key book applying to the account, the at least one key book having a key page. The system includes: a hardware processor; and a memory device storing instructions. When the instructions are executed by the processor, they cause the processor to: record a multi-signature transaction originating from the account in the secondary chain; associate the transaction with the key page of the at least one key book, the key page including (i) a signature-authorization rule, and (ii) a plurality of keys corresponding to a plurality of transaction authorizers; record, in the secondary chain, an authorization of the transaction from a transaction authorizer of the plurality of transaction authorizers; and once a number of authorizations recorded on the secondary chain satisfies the signature-authorization rule, record the transaction on the primary chain for execution.

18 Claims, 15 Drawing Sheets

Related U.S. Application Data continuation-in-part of application No. 17/844,012, filed on Jun. 19, 2022, now Pat. No. 12,007,972.

(60) Provisional application No. 63/226,822, filed on Jul. 29, 2021, provisional application No. 63/225,633, filed on Jul. 26, 2021, provisional application No. 63/213,958, filed on Jun. 23, 2021, provisional application No. 63/212,622, filed on Jun. 19, 2021.

(51) Int. Cl.
H04L 9/08 (2006.01)
H04L 9/32 (2006.01)

(56) References Cited

U.S. PATENT DOCUMENTS

| | | | |
|---|---|---|---|
| 5,606,609 A | 2/1997 | Houser | |
| 5,862,218 A | 1/1999 | Steinberg | |
| 5,920,629 A | 7/1999 | Rosen | |
| 5,966,446 A | 10/1999 | Davis | |
| 6,363,481 B1 | 3/2002 | Hardjono | |
| 7,028,263 B2 | 4/2006 | Maguire | |
| 7,212,808 B2 | 5/2007 | Engstrom | |
| 7,272,179 B2 | 9/2007 | Siemens | |
| 7,572,179 B2 | 8/2009 | Choi | |
| 7,729,950 B2 | 6/2010 | Mendizabal | |
| 7,730,113 B1 | 6/2010 | Payette | |
| 8,245,038 B2 | 8/2012 | Golle | |
| 8,266,439 B2 | 9/2012 | Haber | |
| 8,359,361 B2 | 1/2013 | Thornton | |
| 8,442,903 B2 | 5/2013 | Zadoorian | |
| 8,560,722 B2 | 10/2013 | Gates | |
| 8,612,477 B2 | 12/2013 | Becker | |
| 8,706,616 B1 | 4/2014 | Flynn | |
| 8,712,887 B2 | 4/2014 | Degroeve | |
| 8,867,741 B2 | 10/2014 | Mccorkindale | |
| 8,943,332 B2 | 1/2015 | Horne | |
| 8,990,322 B2 | 3/2015 | Cai | |
| 9,124,423 B2 | 9/2015 | Jennas, II | |
| 9,325,653 B1 | 4/2016 | Peterson | |
| 9,378,343 B1 | 6/2016 | David | |
| 9,396,006 B2 | 7/2016 | Kundu | |
| 9,398,018 B2 | 7/2016 | Macgregor | |
| 9,407,431 B2 | 8/2016 | Bellare | |
| 9,411,524 B2 | 8/2016 | O'Hare | |
| 9,411,976 B2 | 8/2016 | Irvine | |
| 9,411,982 B1 | 8/2016 | Dippenaar | |
| 9,424,576 B2 | 8/2016 | Vandervort | |
| 9,436,923 B1 | 9/2016 | Sriram | |
| 9,436,935 B2 | 9/2016 | Hudon | |
| 9,472,069 B2 | 10/2016 | Roskowski | |
| 9,489,827 B2 | 11/2016 | Quinn | |
| 9,584,493 B1 | 2/2017 | Leavy | |
| 9,588,790 B1 | 3/2017 | Wagner | |
| 9,647,977 B2 | 5/2017 | Levasseur | |
| 9,722,790 B2 | 8/2017 | Ebrahimi | |
| 9,818,109 B2 | 11/2017 | Loh | |
| 9,830,580 B2 | 11/2017 | Macgregor | |
| 9,875,510 B1 | 1/2018 | Kasper | |
| 9,876,646 B2 | 1/2018 | Ebrahimi | |
| 9,882,918 B1 | 1/2018 | Ford | |
| 10,025,941 B1 | 7/2018 | Griffin | |
| 10,046,228 B2 | 8/2018 | Tran | |
| 10,102,265 B1 | 10/2018 | Madisetti | |
| 10,102,526 B1 | 10/2018 | Madisetti | |
| 10,108,954 B2 | 10/2018 | Dunlevy | |
| 10,135,607 B1 | 11/2018 | Roets | |
| 10,135,609 B2 | 11/2018 | Bibera | |
| 10,163,080 B2 | 12/2018 | Chow | |
| 10,250,395 B1 * | 4/2019 | Borne-Pons | H04L 9/3247 |
| 10,270,599 B2 | 4/2019 | Nadeau | |
| 10,346,815 B2 | 7/2019 | Glover | |
| 10,355,869 B2 | 7/2019 | Bisti | |
| 10,366,204 B2 | 7/2019 | Tanner, Jr. | |
| 10,373,129 B1 | 8/2019 | James | |
| 10,411,897 B2 | 9/2019 | Paolini-Subramanya | |
| 10,419,225 B2 | 9/2019 | Deery | |
| 10,438,285 B1 | 10/2019 | Konstantinides | |
| 10,438,290 B1 | 10/2019 | Winklevoss | |
| 10,476,847 B1 | 11/2019 | Smith | |
| 10,532,268 B2 | 1/2020 | Tran | |
| 10,586,270 B2 | 3/2020 | Reddy | |
| 10,628,268 B1 | 4/2020 | Baruch | |
| 10,657,151 B2 | 5/2020 | Qiu | |
| 10,685,399 B2 | 6/2020 | Snow | |
| 10,693,652 B2 | 6/2020 | Nadeau | |
| 10,726,346 B2 | 7/2020 | Saxena | |
| 10,749,848 B2 | 8/2020 | Voell | |
| 10,764,752 B1 | 9/2020 | Avetisov | |
| 10,783,164 B2 | 9/2020 | Snow | |
| 10,817,873 B2 | 10/2020 | Paolini-Subramanya | |
| 10,826,685 B1 | 11/2020 | Campagna | |
| 10,841,372 B1 | 11/2020 | Ram | |
| 10,855,446 B2 | 12/2020 | Ow | |
| 10,873,457 B1 | 12/2020 | Beaudoin | |
| 10,915,895 B1 | 2/2021 | Fogg | |
| 10,929,842 B1 | 2/2021 | Arvanaghi | |
| 10,949,926 B1 | 3/2021 | Call | |
| 10,956,973 B1 | 3/2021 | Chang | |
| 10,958,418 B2 | 3/2021 | Ajoy | |
| 10,997,159 B2 | 5/2021 | Iwama | |
| 11,042,871 B2 | 6/2021 | Snow | |
| 11,044,095 B2 | 6/2021 | Lynde | |
| 11,044,097 B2 | 6/2021 | Snow | |
| 11,044,100 B2 | 6/2021 | Deery | |
| 11,063,770 B1 | 7/2021 | Peng | |
| 11,075,744 B2 | 7/2021 | Tormasov | |
| 11,093,933 B1 | 8/2021 | Peng | |
| 11,134,120 B2 | 9/2021 | Snow | |
| 11,164,250 B2 | 11/2021 | Snow | |
| 11,164,254 B1 | 11/2021 | Gordon, III | |
| 11,170,366 B2 | 11/2021 | Snow | |
| 11,171,782 B2 | 11/2021 | Tang | |
| 11,205,172 B2 | 12/2021 | Snow | |
| 11,265,173 B2 * | 3/2022 | Liao | G06F 21/64 |
| 11,276,056 B2 | 3/2022 | Snow | |
| 11,281,660 B1 * | 3/2022 | Pike | G06F 16/27 |
| 11,295,296 B2 | 4/2022 | Snow | |
| 11,296,889 B2 | 4/2022 | Snow | |
| 11,328,290 B2 | 5/2022 | Snow | |
| 11,334,874 B2 | 5/2022 | Snow | |
| 11,347,769 B2 | 5/2022 | Snow | |
| 11,348,097 B2 | 5/2022 | Snow | |
| 11,348,098 B2 | 5/2022 | Snow | |
| 11,423,398 B1 | 8/2022 | Mullins | |
| 11,438,143 B2 * | 9/2022 | Collins | H04L 9/0643 |
| 11,886,425 B2 * | 1/2024 | Pezeshki | G06F 16/2379 |
| 11,943,334 B2 | 3/2024 | Snow | |
| 2001/0029482 A1 | 10/2001 | Tealdi | |
| 2003/0018563 A1 | 1/2003 | Kilgour | |
| 2004/0085445 A1 | 5/2004 | Park | |
| 2004/0168052 A1 | 8/2004 | Clisham | |
| 2005/0206741 A1 | 9/2005 | Raber | |
| 2006/0075228 A1 | 4/2006 | Black | |
| 2006/0184443 A1 | 8/2006 | Erez | |
| 2007/0027787 A1 | 2/2007 | Tripp | |
| 2007/0094272 A1 | 4/2007 | Yeh | |
| 2007/0174630 A1 | 7/2007 | Shannon | |
| 2007/0294235 A1 | 12/2007 | Millett | |
| 2007/0296817 A1 | 12/2007 | Ebrahimi | |
| 2008/0010466 A1 | 1/2008 | Hopper | |
| 2008/0028439 A1 | 1/2008 | Shevade | |
| 2008/0059726 A1 | 3/2008 | Rozas | |
| 2009/0025063 A1 | 1/2009 | Thomas | |
| 2009/0287597 A1 | 11/2009 | Bahar | |
| 2010/0049966 A1 | 2/2010 | Kato | |
| 2010/0058476 A1 | 3/2010 | Isoda | |
| 2010/0161459 A1 | 6/2010 | Kass | |
| 2010/0228798 A1 | 9/2010 | Kodama | |
| 2010/0241537 A1 | 9/2010 | Kass | |
| 2011/0061092 A1 | 3/2011 | Bailloeul | |
| 2011/0161674 A1 | 6/2011 | Ming | |
| 2011/0199469 A1 | 8/2011 | Gallagher | |

(56) References Cited

U.S. PATENT DOCUMENTS

| | | |
|---|---|---|
| 2012/0059824 A1 | 3/2012 | Simon |
| 2012/0203670 A1 | 8/2012 | Piersol |
| 2012/0264520 A1 | 10/2012 | Marsland |
| 2013/0142323 A1 | 6/2013 | Chiarella |
| 2013/0222587 A1 | 8/2013 | Roskowski |
| 2013/0275765 A1 | 10/2013 | Lay |
| 2013/0276058 A1 | 10/2013 | Buldas |
| 2014/0022973 A1 | 1/2014 | Kopikare |
| 2014/0201541 A1 | 7/2014 | Paul |
| 2014/0229738 A1 | 8/2014 | Sato |
| 2014/0279762 A1 | 9/2014 | Xaypanya |
| 2014/0282852 A1 | 9/2014 | Vestevich |
| 2014/0289802 A1 | 9/2014 | Lee |
| 2014/0297447 A1 | 10/2014 | O'Brien |
| 2014/0344015 A1 | 11/2014 | Puértolas-Montañés |
| 2015/0052615 A1 | 2/2015 | Gault |
| 2015/0193633 A1 | 7/2015 | Chida |
| 2015/0206106 A1 | 7/2015 | Yago |
| 2015/0242835 A1 | 8/2015 | Vaughan |
| 2015/0244729 A1 | 8/2015 | Mao |
| 2015/0309831 A1 | 10/2015 | Powers |
| 2015/0332256 A1 | 11/2015 | Minor |
| 2015/0363769 A1 | 12/2015 | Ronca |
| 2015/0378627 A1 | 12/2015 | Kitazawa |
| 2015/0379484 A1 | 12/2015 | Mccarthy |
| 2016/0002923 A1 | 1/2016 | Alobily |
| 2016/0012240 A1 | 1/2016 | Smith |
| 2016/0021743 A1 | 1/2016 | Pai |
| 2016/0071096 A1 | 3/2016 | Rosca |
| 2016/0085955 A1 | 3/2016 | Lerner |
| 2016/0098578 A1 | 4/2016 | Hincker |
| 2016/0119134 A1 | 4/2016 | Hakoda |
| 2016/0148198 A1 | 5/2016 | Kelley |
| 2016/0162897 A1 | 6/2016 | Feeney |
| 2016/0217436 A1 | 7/2016 | Brama |
| 2016/0239653 A1 | 8/2016 | Loughlin-Mchugh et al. |
| 2016/0253663 A1 | 9/2016 | Clark |
| 2016/0260091 A1 | 9/2016 | Tobias |
| 2016/0267472 A1 | 9/2016 | Lingham |
| 2016/0267558 A1 | 9/2016 | Bonnell |
| 2016/0275294 A1 | 9/2016 | Irvine |
| 2016/0283920 A1 | 9/2016 | Fisher |
| 2016/0292396 A1 | 10/2016 | Akerwall |
| 2016/0292672 A1 | 10/2016 | Fay |
| 2016/0292680 A1 | 10/2016 | Wilson, Jr. |
| 2016/0294783 A1 | 10/2016 | Piqueras Jover |
| 2016/0300200 A1 | 10/2016 | Brown |
| 2016/0300234 A1 | 10/2016 | Moss-Pultz |
| 2016/0321675 A1 | 11/2016 | Mccoy |
| 2016/0321751 A1 | 11/2016 | Creighton, IV |
| 2016/0321769 A1 | 11/2016 | Mccoy |
| 2016/0328791 A1 | 11/2016 | Parsells |
| 2016/0330031 A1* | 11/2016 | Drego ................... H04L 9/3239 |
| 2016/0330244 A1 | 11/2016 | Denton |
| 2016/0337119 A1 | 11/2016 | Hosaka |
| 2016/0342977 A1 | 11/2016 | Lam |
| 2016/0342989 A1 | 11/2016 | Davis |
| 2016/0344737 A1 | 11/2016 | Anton |
| 2016/0371771 A1 | 12/2016 | Serrano |
| 2017/0000613 A1 | 1/2017 | Lerf |
| 2017/0005797 A1 | 1/2017 | Lanc |
| 2017/0005804 A1 | 1/2017 | Zinder |
| 2017/0033933 A1 | 2/2017 | Haber |
| 2017/0053249 A1 | 2/2017 | Tunnell |
| 2017/0061396 A1 | 3/2017 | Melika |
| 2017/0075938 A1 | 3/2017 | Black |
| 2017/0103167 A1 | 4/2017 | Shah |
| 2017/0124534 A1 | 5/2017 | Savolainen |
| 2017/0124535 A1 | 5/2017 | Juels |
| 2017/0134162 A1 | 5/2017 | Code |
| 2017/0148016 A1 | 5/2017 | Davis |
| 2017/0161439 A1 | 6/2017 | Raduchel |
| 2017/0177898 A1 | 6/2017 | Dillenberger |
| 2017/0178237 A1 | 6/2017 | Wong |
| 2017/0213287 A1 | 7/2017 | Bruno |
| 2017/0221052 A1 | 8/2017 | Sheng |
| 2017/0228731 A1 | 8/2017 | Sheng |
| 2017/0236123 A1 | 8/2017 | Ali |
| 2017/0243208 A1 | 8/2017 | Kurian |
| 2017/0243289 A1 | 8/2017 | Rufo |
| 2017/0244757 A1 | 8/2017 | Castinado |
| 2017/0269186 A1 | 9/2017 | Sharma |
| 2017/0330279 A1 | 11/2017 | Ponzone |
| 2017/0344983 A1 | 11/2017 | Muftic |
| 2017/0346693 A1 | 11/2017 | Dix |
| 2017/0352027 A1* | 12/2017 | Zhang ................... H04L 9/0825 |
| 2017/0352031 A1 | 12/2017 | Collin |
| 2017/0353309 A1 | 12/2017 | Gray |
| 2017/0359374 A1 | 12/2017 | Smith |
| 2017/0364642 A1 | 12/2017 | Bogdanowicz |
| 2017/0373859 A1 | 12/2017 | Shors |
| 2018/0005186 A1 | 1/2018 | Hunn |
| 2018/0048599 A1 | 2/2018 | Arghandiwal |
| 2018/0075239 A1 | 3/2018 | Boutnaru |
| 2018/0075527 A1 | 3/2018 | Nagla |
| 2018/0082043 A1 | 3/2018 | Witchey |
| 2018/0088928 A1 | 3/2018 | Smith |
| 2018/0091524 A1 | 3/2018 | Setty |
| 2018/0097779 A1 | 4/2018 | Karame |
| 2018/0101701 A1 | 4/2018 | Barinov |
| 2018/0101842 A1 | 4/2018 | Ventura |
| 2018/0108024 A1 | 4/2018 | Greco |
| 2018/0117446 A1 | 5/2018 | Tran |
| 2018/0123779 A1 | 5/2018 | Zhang |
| 2018/0139042 A1 | 5/2018 | Binning |
| 2018/0144292 A1 | 5/2018 | Mattingly |
| 2018/0157700 A1 | 6/2018 | Roberts |
| 2018/0158034 A1 | 6/2018 | Hunt |
| 2018/0167201 A1 | 6/2018 | Naqvi |
| 2018/0173906 A1 | 6/2018 | Rodriguez |
| 2018/0176017 A1 | 6/2018 | Rodriguez |
| 2018/0181768 A1 | 6/2018 | Leporini |
| 2018/0182042 A1 | 6/2018 | Vishwa |
| 2018/0183602 A1 | 6/2018 | Campagna |
| 2018/0189333 A1 | 7/2018 | Childress |
| 2018/0189781 A1 | 7/2018 | Mccann |
| 2018/0204213 A1 | 7/2018 | Zappier |
| 2018/0212779 A1 | 7/2018 | Bergmann |
| 2018/0219683 A1 | 8/2018 | Deery |
| 2018/0219685 A1 | 8/2018 | Deery |
| 2018/0225640 A1 | 8/2018 | Chapman |
| 2018/0225649 A1 | 8/2018 | Babar |
| 2018/0241565 A1 | 8/2018 | Paolini-Subramanya |
| 2018/0253702 A1 | 9/2018 | Dowding |
| 2018/0260888 A1 | 9/2018 | Paolini-Subramanya |
| 2018/0260889 A1 | 9/2018 | Paolini-Subramanya |
| 2018/0268162 A1 | 9/2018 | Dillenberger |
| 2018/0268382 A1 | 9/2018 | Wasserman |
| 2018/0268504 A1 | 9/2018 | Paolini-Subramanya |
| 2018/0276270 A1 | 9/2018 | Bisbee |
| 2018/0276668 A1 | 9/2018 | Li |
| 2018/0276745 A1 | 9/2018 | Paolini-Subramanya |
| 2018/0285879 A1 | 10/2018 | Gadnis |
| 2018/0285970 A1 | 10/2018 | Snow |
| 2018/0285971 A1 | 10/2018 | Rosenoer |
| 2018/0288022 A1 | 10/2018 | Madisetti |
| 2018/0315051 A1 | 11/2018 | Hurley |
| 2018/0316502 A1 | 11/2018 | Nadeau |
| 2018/0330349 A1 | 11/2018 | Uhr |
| 2018/0356236 A1 | 12/2018 | Lawrenson |
| 2018/0365201 A1 | 12/2018 | Hunn |
| 2018/0365686 A1 | 12/2018 | Kondo |
| 2018/0365764 A1 | 12/2018 | Nelson |
| 2018/0367298 A1 | 12/2018 | Wright |
| 2019/0012637 A1 | 1/2019 | Gillen |
| 2019/0013948 A1 | 1/2019 | Mercuri |
| 2019/0018947 A1 | 1/2019 | Li |
| 2019/0028273 A1 | 1/2019 | Harras |
| 2019/0034459 A1 | 1/2019 | Qiu |
| 2019/0036887 A1 | 1/2019 | Miller |
| 2019/0036957 A1 | 1/2019 | Smith |
| 2019/0043048 A1 | 2/2019 | Wright |
| 2019/0044727 A1 | 2/2019 | Scott |
| 2019/0050855 A1 | 2/2019 | Martino |

(56) References Cited

U.S. PATENT DOCUMENTS

| | | | |
|---|---|---|---|
| 2019/0057382 A1 | 2/2019 | Wright | |
| 2019/0058581 A1* | 2/2019 | Wood | H04L 9/3239 |
| 2019/0065709 A1 | 2/2019 | Salomon | |
| 2019/0073666 A1 | 3/2019 | Ortiz | |
| 2019/0080284 A1 | 3/2019 | Kim | |
| 2019/0081793 A1 | 3/2019 | Martino | |
| 2019/0081796 A1 | 3/2019 | Chow | |
| 2019/0087446 A1 | 3/2019 | Sharma | |
| 2019/0123889 A1 | 4/2019 | Schmidt-Karaca | |
| 2019/0132350 A1 | 5/2019 | Smith | |
| 2019/0188699 A1 | 6/2019 | Thibodeau | |
| 2019/0197532 A1 | 6/2019 | Jayachandran | |
| 2019/0205563 A1 | 7/2019 | Gonzales, Jr. | |
| 2019/0207748 A1 | 7/2019 | Courtney | |
| 2019/0236286 A1 | 8/2019 | Scriber | |
| 2019/0251557 A1 | 8/2019 | Jin | |
| 2019/0253240 A1 | 8/2019 | Treat | |
| 2019/0253258 A1 | 8/2019 | Thekadath | |
| 2019/0268141 A1 | 8/2019 | Pandurangan | |
| 2019/0268163 A1 | 8/2019 | Nadeau | |
| 2019/0281259 A1 | 9/2019 | Palazzolo | |
| 2019/0287107 A1 | 9/2019 | Gaur | |
| 2019/0287199 A1 | 9/2019 | Messerges | |
| 2019/0287200 A1 | 9/2019 | Schuler | |
| 2019/0288832 A1 | 9/2019 | Dang | |
| 2019/0296915 A1 | 9/2019 | Lancashire | |
| 2019/0303623 A1 | 10/2019 | Reddy | |
| 2019/0303887 A1 | 10/2019 | Wright | |
| 2019/0306150 A1 | 10/2019 | Letz | |
| 2019/0311357 A1 | 10/2019 | Madisetti | |
| 2019/0318117 A1 | 10/2019 | Beecham | |
| 2019/0319782 A1 | 10/2019 | Ghosh | |
| 2019/0324867 A1 | 10/2019 | Tang | |
| 2019/0332691 A1 | 10/2019 | Beadles | |
| 2019/0333054 A1 | 10/2019 | Cona | |
| 2019/0334715 A1 | 10/2019 | Gray | |
| 2019/0334912 A1 | 10/2019 | Sloane | |
| 2019/0340267 A1 | 11/2019 | Vo | |
| 2019/0340586 A1 | 11/2019 | Sheng | |
| 2019/0340607 A1 | 11/2019 | Lynn | |
| 2019/0342422 A1 | 11/2019 | Li | |
| 2019/0347444 A1 | 11/2019 | Lowagie | |
| 2019/0347628 A1 | 11/2019 | Al-Naji | |
| 2019/0349190 A1 | 11/2019 | Smith | |
| 2019/0349426 A1 | 11/2019 | Smith | |
| 2019/0354606 A1 | 11/2019 | Snow | |
| 2019/0354607 A1 | 11/2019 | Snow | |
| 2019/0354611 A1 | 11/2019 | Snow | |
| 2019/0354724 A1 | 11/2019 | Lowagie | |
| 2019/0354725 A1 | 11/2019 | Lowagie | |
| 2019/0354964 A1 | 11/2019 | Snow | |
| 2019/0356733 A1 | 11/2019 | Snow | |
| 2019/0361917 A1 | 11/2019 | Tran | |
| 2019/0372770 A1 | 12/2019 | Xu | |
| 2019/0378128 A1 | 12/2019 | Moore | |
| 2019/0385165 A1 | 12/2019 | Castinado | |
| 2019/0386940 A1 | 12/2019 | Hong | |
| 2019/0391540 A1 | 12/2019 | Westervelt | |
| 2019/0391858 A1 | 12/2019 | Studnicka | |
| 2019/0394044 A1 | 12/2019 | Snow | |
| 2019/0394048 A1 | 12/2019 | Deery | |
| 2020/0004263 A1 | 1/2020 | Dalla Libera | |
| 2020/0004946 A1 | 1/2020 | Gilpin | |
| 2020/0005270 A1 | 1/2020 | Griffith | |
| 2020/0005290 A1 | 1/2020 | Madisetti | |
| 2020/0007341 A1 | 1/2020 | Veeningen | |
| 2020/0019937 A1 | 1/2020 | Edwards | |
| 2020/0034571 A1 | 1/2020 | Fett | |
| 2020/0034813 A1 | 1/2020 | Calinog | |
| 2020/0042635 A1 | 2/2020 | Douglass | |
| 2020/0042960 A1 | 2/2020 | Cook | |
| 2020/0042982 A1 | 2/2020 | Snow | |
| 2020/0042983 A1 | 2/2020 | Snow | |
| 2020/0042984 A1 | 2/2020 | Snow | |
| 2020/0042985 A1 | 2/2020 | Snow | |
| 2020/0042986 A1 | 2/2020 | Snow | |
| 2020/0042987 A1 | 2/2020 | Snow | |
| 2020/0042988 A1 | 2/2020 | Snow | |
| 2020/0042990 A1 | 2/2020 | Snow | |
| 2020/0042995 A1 | 2/2020 | Snow | |
| 2020/0044827 A1 | 2/2020 | Snow | |
| 2020/0044856 A1 | 2/2020 | Lynde | |
| 2020/0044857 A1 | 2/2020 | Snow | |
| 2020/0065761 A1 | 2/2020 | Tatchell | |
| 2020/0067907 A1 | 2/2020 | Avetisov | |
| 2020/0075056 A1 | 3/2020 | Yang | |
| 2020/0089690 A1 | 3/2020 | Qiu | |
| 2020/0099524 A1 | 3/2020 | Schiatti | |
| 2020/0099534 A1 | 3/2020 | Lowagie | |
| 2020/0104712 A1 | 4/2020 | Katz | |
| 2020/0118068 A1 | 4/2020 | Turetsky | |
| 2020/0127812 A1 | 4/2020 | Schuler | |
| 2020/0134760 A1 | 4/2020 | Messerges | |
| 2020/0145219 A1 | 5/2020 | Sebastian | |
| 2020/0151714 A1 | 5/2020 | Chan | |
| 2020/0160326 A1 | 5/2020 | Sarin | |
| 2020/0167870 A1 | 5/2020 | Isaacson | |
| 2020/0175506 A1 | 6/2020 | Snow | |
| 2020/0195441 A1* | 6/2020 | Suen | G06F 16/1805 |
| 2020/0201964 A1 | 6/2020 | Nandakumar | |
| 2020/0211005 A1 | 7/2020 | Bodorik | |
| 2020/0211011 A1 | 7/2020 | Anderson | |
| 2020/0231122 A1 | 7/2020 | Simlett | |
| 2020/0234386 A1 | 7/2020 | Blackman | |
| 2020/0250747 A1* | 8/2020 | Padmanabhan | G06Q 20/065 |
| 2020/0258061 A1 | 8/2020 | Beadles | |
| 2020/0279324 A1 | 9/2020 | Snow | |
| 2020/0279325 A1 | 9/2020 | Snow | |
| 2020/0279326 A1 | 9/2020 | Snow | |
| 2020/0280447 A1 | 9/2020 | Snow | |
| 2020/0286082 A1* | 9/2020 | Cheng | G06Q 20/389 |
| 2020/0302433 A1 | 9/2020 | Green | |
| 2020/0304289 A1 | 9/2020 | Androulaki | |
| 2020/0314648 A1 | 10/2020 | Cao | |
| 2020/0320097 A1 | 10/2020 | Snow | |
| 2020/0320514 A1 | 10/2020 | Snow | |
| 2020/0320521 A1 | 10/2020 | Snow | |
| 2020/0320522 A1 | 10/2020 | Snow | |
| 2020/0320620 A1 | 10/2020 | Snow | |
| 2020/0322159 A1 | 10/2020 | Xu | |
| 2020/0358619 A1 | 11/2020 | Ding | |
| 2020/0366495 A1 | 11/2020 | Mahoney | |
| 2020/0374129 A1 | 11/2020 | Dilles | |
| 2020/0382480 A1 | 12/2020 | Isaacson | |
| 2020/0389294 A1 | 12/2020 | Soundararajan | |
| 2021/0035092 A1 | 2/2021 | Pierce | |
| 2021/0042758 A1 | 2/2021 | Durvasula | |
| 2021/0044976 A1 | 2/2021 | Avetisov | |
| 2021/0073212 A1 | 3/2021 | Conley | |
| 2021/0073750 A1 | 3/2021 | Ledford | |
| 2021/0090076 A1 | 3/2021 | Wright | |
| 2021/0097602 A1 | 4/2021 | Eichel | |
| 2021/0119785 A1 | 4/2021 | Ben-Reuven | |
| 2021/0144149 A1 | 5/2021 | Simons | |
| 2021/0152332 A1 | 5/2021 | Chen | |
| 2021/0174353 A1 | 6/2021 | Snow | |
| 2021/0176038 A1 | 6/2021 | Bortnikov | |
| 2021/0194673 A1 | 6/2021 | Collins | |
| 2021/0200653 A1 | 7/2021 | Jetzfellner | |
| 2021/0201321 A1 | 7/2021 | Studnitzer | |
| 2021/0201328 A1 | 7/2021 | Gunther | |
| 2021/0217002 A1* | 7/2021 | Basu | H04L 9/0841 |
| 2021/0226769 A1 | 7/2021 | Snow | |
| 2021/0226773 A1 | 7/2021 | Snow | |
| 2021/0241282 A1 | 8/2021 | Gu | |
| 2021/0248514 A1 | 8/2021 | Cella | |
| 2021/0266167 A1 | 8/2021 | Lohe | |
| 2021/0266174 A1 | 8/2021 | Snow | |
| 2021/0272103 A1 | 9/2021 | Snow | |
| 2021/0273810 A1 | 9/2021 | Lynde | |
| 2021/0273816 A1 | 9/2021 | Deery | |
| 2021/0297397 A1 | 9/2021 | Bartolucci | |
| 2021/0326815 A1 | 10/2021 | Brody | |
| 2021/0328804 A1 | 10/2021 | Snow | |

(56) References Cited

U.S. PATENT DOCUMENTS

| | | |
|---|---|---|
| 2021/0342836 A1 | 11/2021 | Cella |
| 2021/0357369 A1 | 11/2021 | Kwon |
| 2021/0366586 A1 | 11/2021 | Ryan |
| 2022/0006641 A1 | 1/2022 | Snow |
| 2022/0012731 A1 | 1/2022 | Derosa-Grund |
| 2022/0019559 A1 | 1/2022 | Snow |
| 2022/0020001 A1 | 1/2022 | Snow |
| 2022/0023742 A1 | 1/2022 | Tran |
| 2022/0027893 A1 | 1/2022 | Snow |
| 2022/0027897 A1 | 1/2022 | Snow |
| 2022/0027994 A1 | 1/2022 | Snow |
| 2022/0027995 A1 | 1/2022 | Snow |
| 2022/0027996 A1 | 1/2022 | Snow |
| 2022/0029805 A1 | 1/2022 | Snow |
| 2022/0030054 A1 | 1/2022 | Snow |
| 2022/0034004 A1 | 2/2022 | Snow |
| 2022/0040557 A1 | 2/2022 | Tran |
| 2022/0043831 A1 | 2/2022 | Douglass |
| 2022/0044162 A1 | 2/2022 | Zhang |
| 2022/0058622 A1 | 2/2022 | Snow |
| 2022/0058623 A1 | 2/2022 | Snow |
| 2022/0083991 A1 | 3/2022 | Kemper |
| 2022/0103341 A1 | 3/2022 | Snow |
| 2022/0103343 A1 | 3/2022 | Snow |
| 2022/0103344 A1 | 3/2022 | Snow |
| 2022/0103364 A1 | 3/2022 | Snow |
| 2022/0141231 A1 | 5/2022 | Simons |
| 2022/0156737 A1 | 5/2022 | Wright |
| 2022/0172207 A1 | 6/2022 | Cella |
| 2022/0173893 A1 | 6/2022 | Basu |
| 2022/0198554 A1 | 6/2022 | Filter |
| 2022/0215389 A1 | 7/2022 | Balaraman |
| 2022/0245626 A1 | 8/2022 | Sewell |
| 2022/0274703 A1* | 9/2022 | Di Cosola ................ G07C 3/14 |
| 2022/0286273 A1 | 9/2022 | Snow |
| 2022/0329630 A1* | 10/2022 | Li ......................... G06F 21/577 |
| 2022/0343768 A1* | 10/2022 | Di Cosola ................ G08G 5/55 |
| 2022/0405260 A1* | 12/2022 | Snow ...................... G06F 16/27 |
| 2022/0405742 A1 | 12/2022 | Ravinathan |
| 2022/0407728 A1* | 12/2022 | Snow ................... H04L 9/0825 |
| 2023/0185783 A1 | 6/2023 | Haddad |
| 2023/0199677 A1 | 6/2023 | Richardson |
| 2023/0334490 A1 | 10/2023 | Ryan |
| 2024/0046391 A1* | 2/2024 | Ma ........................... H04L 9/12 |
| 2024/0113862 A1 | 4/2024 | Snow |
| 2024/0187254 A1 | 6/2024 | Deery |
| 2024/0205030 A1 | 6/2024 | Wright |
| 2024/0275580 A1 | 8/2024 | Snow |
| 2024/0275619 A1 | 8/2024 | O'Meara |
| 2024/0296171 A1 | 9/2024 | Douglass |
| 2024/0330317 A1 | 10/2024 | Snow |
| 2024/0388621 A1 | 11/2024 | Snow |
| 2025/0184117 A1 | 6/2025 | Snow |
| 2025/0286731 A1 | 9/2025 | Brian |

FOREIGN PATENT DOCUMENTS

| | | |
|---|---|---|
| CN | 110599147 A | 12/2019 |
| CN | 112329041 A | 2/2021 |
| DE | 10128728 | 1/2003 |
| EP | 3726438 A1 | 10/2020 |
| EP | 3862947 A1 | 8/2021 |
| JP | S5383297 | 7/1978 |
| JP | 2021152931 A | 9/2021 |
| KR | 100653512 | 12/2006 |
| KR | 1747221 | 5/2017 |
| KR | 101747221 | 6/2017 |
| WO | 0049797 | 8/2000 |
| WO | 2007069176 | 6/2007 |
| WO | 2015077378 | 5/2015 |
| WO | 2017190795 A1 | 11/2017 |
| WO | 2018013898 A1 | 1/2018 |
| WO | 2018109010 | 6/2018 |
| WO | 2018127923 A1 | 7/2018 |
| WO | 2018127923072018 | 7/2018 |
| WO | 2018208105 A1 | 11/2018 |
| WO | 2019180702 | 9/2019 |
| WO | 2019207504 | 10/2019 |
| WO | 2020125839 A1 | 6/2020 |

OTHER PUBLICATIONS

Alsolami, Fahad, and Terrance E. Boult. "CloudStash: using secret-sharing scheme to secure data, not keys, in multi-clouds." Information Technology: New Generations (ITNG), 2014 11th International Conference on. IEEE, 2014. 7 pages.

Ana Reyna et al.; On blockchain and its integration with IoT. Challenges and opportunities. Future generation computer systems. vol. 88, Nov. 2018, pp. 173-190. https://www.sciencedirect.com/science/article/pii/S0167739X17329205 (Year: 2018).

Basis: A Price-Stable Cryptocurrency with an Algorithmic Central Bank Formerly known as: Basecoin Nader Al-Naji j@intangiblelabs.co), Josh Chen (Year: 2018) 27 pages.

Casey, "BitBeat: Factom Touts Blockchain Tool for Keeping Record Keepers Honest", Wall Street Journal, Nov. 5, 2014. 2 pages.

Chakravorty, Antorweep, and Chunming Rong, "Ushare: user controlled social media based on blockchain." Proceedings of the 11th International Conference on Ubiquitous Information Management and Communication. ACM, 2017. 6 pages.

Chen, Zhixong, and Yixuan Zhu. "Personal Archive Service System using Blockchain Technology: Case Study, Promising and Challenging." AI & Mobile Services (AIMS), 2017 IEEE International Conference on. IEEE, 2017. 7 pages.

Crosby, Michael et al., "BlockChain Technology, Beyond Bitcoin", Sutardja Center for Entrepreneurship & Technology, Berkeley Engineering, Oct. 16, 2015, 35 pages.

Dai et al. TrialChain: A Blockchain-Based Platform to Validate Data Integrity in Large, Biomedical Research Studies arXiv: 1807.03662 Jul. 10, 2018 (Year: 2018). 7 pages.

Eberhardt et al., "ZoKrates—Scalable Privacy-Preserving Off-Chain Computations," https://ieeexplore.ieee.org/stamp/JSP?tp:::&armumber:::8726497. (Year:2018) 8 pages.

Encoding, Encryption, and Hashing by Andrea Chiarelli (Year: 2022).

Feng and Luo, "Evaluating Memory-Hard Proof-of-Work Algorithms on Three Processors," PVLDB, 13(6): 898-911, 2020.

Fernandez-Carames et al.; A Review on the Use of Blockchain for the Internet of Things. https://ieeexplore.ieee.org/stamp/stamp.jsp?arnumber=8370027 (Year: 2018). 23 pages.

Haarmann, et al., "DMN Decision Execution on the Ethereum Blockchain," Hasso Plattner Institute, University of Potsdam, May 17, 2018, 15 pages.

Iddo Bentov, Bitcoin and Secure Computation with Money, May 2016 (Year: 2016). 177 pages.

Kim et al., "A Perspective on Blockchain Smart Contracts," Schulich School of Business, York University, Toronto, Canada, 2017, 6 pages.

Kroeger, T. et al., The Case for Distributed Data Archival Using Secret Splitting with Percival, 6th International Symposium on Resilient Control Systems (available at IEEE Xplore), p. 204-209 (Year: 2013).

Krol, Michal et al., "SPOC: Secure Payments for Outsourced Computations" https://arxiv.org/pdf/1807.06462.pdf. (Year: 2018) 6 pages.

Luther, "Do We Need a "Fedcoin" Cryptocurrency?," ValueWalk, Newstex Global Business Blogs, Dec. 30, 2015 (Year: 2015) 10 pages.

Luu et al., Making Smart Contracts Smarter, 2016. 16 pages.

Menezes, Alfred. J., et al. "Handbook of Applied Cryptography," 1997, CRC Press, p. 527-28.

Merkle Mountain Ranges (MMRs)-Grin Documentation, https://quentinlesceller.github.io/grin-docs/technical/building-blocks/merkle-mountain-ranges/, 5 pages, printed Jun. 1, 2022.

Merkle Mountain Ranges, https://github.com/opentimestamps/opentimestamps-server/blob/master/doc/merkle-mountain-range.md, 3 pages, printed Jun. 1, 2022.

(56) References Cited

OTHER PUBLICATIONS

Michelson, Kyle, et al., "Accumulate: An identity-based blockchain protocol with cross-chain support, human-readable addresses, and key management capabilities", Accumulate Whitepaper, v1.0, Jun. 12, 2022, 28 pages.

MOF-BC: A Memory Optimized and Flexible BlockChain for Large Scale Networks. (Year:2018) 43 pages.

Muhamed et al. EduCTX: A Blockchain-Based Higher Education Credit Platform, https://ieeexplore.ieee.org/stamp/stamp.jsp?arnumber=8247166. (Year: 2017). 16 pages.

On blockchain and its integration with IoT. Challenges and opportunities. (Year: 2018) 18 pages.

P. Sood, P. Palsania, S. Ahuja, S. Kumar, K. Khatter and A. Mishra, "Decentralised & Collaborative DocuPad Using Blockchain," 2022 IEEE Delhi Section Conference (DELCON), New Delhi, India, 2022, pp. 1-8, doi: 10.1109/DELCON54057.2022.9752853. ( Year: 2022).

Sokolowski, R. (2011). Signed, sealed, delivered: EMortgages are protected from unauthorized alteration by something called a tamper seal. Mortgage Banking, 71(6), 108(4). 8 pages. Retrieved from https://dialog.proquest.com/professional/docview/1068158815?accountid=131444 (Year: 2011).

United States: New Generation cryptocurrency, USDX Protocol, Offers Crypto Advantages and Fiat Pegging, Apr. 2, 2018 (Year: 2018). 3 pages.

Unknown, "Federated Learning: Collaborative Machine Learning without Centralized Training Data" Apr. 6, 2017, 11 pages.

Unknown, "Midex", https://promo.midex.com/Midex_EN.pdf, 2017, 25 pages.

Unknown, Xtrade White Paper, https://xtrade1-9649.kxcdn.com/wp-content/uploads/2017/09/xtrade-whitepaper.pdf Feb. 7, 2018, 37 pages.

Watanabe, Hiroki, et al. "Blockchain contract: Securing a blockchain applied to smart contracts." 2016 IEEE International Conference on Consumer Electronics (ICCE). IEEE, 2016. 2 pages.

White, Ron, "How Computers Work," Oct. 2003, QUE, Seventh Edition (Year: 2003), 23 pages.

Why offchain storage is needed for blockchain_V4_1 FINAL (Year: 2018), by IBM, 13 pages.

ZoKrates—Scalable Privacy-Preserving Off-Chain Computations, by Jacob Eberhardt, Stefan Tai , 8 pages, Nov. 3, 2011 (Year: 2011).

* cited by examiner

SYSTEMS AND METHODS FOR PROCESSING BLOCKCHAIN TRANSACTIONS

REFERENCE TO PRIOR APPLICATIONS

This application is a continuation in part of U.S. non-provisional application Ser. No. 17/844,012, filed on Jun. 19, 2022, which claims the benefit of the following two provisional applications: (i) U.S. Provisional Application Ser. No. 63/212,622, filed on Jun. 19, 2021, and (ii) U.S. Provisional Application Ser. No. 63/213,958, filed on Jun. 23, 2021. This application also claims the benefit of the following U.S. provisional applications: (i) U.S. Provisional Application Ser. No. 63/225,633, filed on Jul. 26, 2021, and (ii) U.S. Provisional Application Ser. No. 63/226,822, filed on Jul. 29, 2021. Each of the above non-provisional and provisional applications is hereby incorporated in its entirety.

FIELD OF THE DISCLOSURE

The present invention relates to an identity-based blockchain system and method that is interoperable with present day layer-1 blockchains.

BACKGROUND

Rapid digitization of the global economy has led to a proliferation of digital currencies, e.g., Bitcoin, Ethereum, Dogecoin, etc., also known as cryptocurrencies. Today, cryptocurrencies are used to buy various goods and services in online transactions. The underlying technology in these processes is called blockchain, which is a decentralized, digital database storing all forms of data, such as transactions, using lists of records, called blocks, that are linked together using cryptography to achieve immutability. The data, such as transactions, can originate from different blockchain accounts. Transactions are typically hashed using a cryptographic algorithm, such as SHA-256 known in the art, and organized into a data structure called a Merkle tree, known in the art. Pairs of transaction hashes are concatenated and hashed (also referred hereto as "combined") until a single hash remains, known as the Merkle root. The Merkle tree is stored within a block and connected to the previous block in the current block header. Thus, each block includes a cryptographic hash of the previous block, time stamp, and data. The time stamp proves that the data in the block existed when the block was published on a decentralized computer system with the block's hash. As each block includes information about the preceding block, the blocks form a chain, with each additional block reinforcing the ones before. Blockchain platforms (systems) have multiple full nodes containing a complete copy of the blockchain and participating in block validation and maintenance of the state of the network. Because the hash value of each block uniquely corresponds to the data in the block, once recorded, the data in any given block cannot be altered retroactively without also altering all the subsequently recorded blocks. Accordingly, if a network node is compromised and a transaction within an existing block is modified, then the Merkle root of this block and the hash values of all subsequent blocks will change, which will cause the network to reject the fraudulent block. As a result, blockchains are resilient to data modifications. The blocks of prior art blockchain systems, however, have a limit on how much data or information they can include, thus each block can be thought of as being limited spatially.

As a result, one of the important challenges for blockchain platforms is the design of data storage and management methods that are efficient and yet are capable of providing a sufficiently high level of security. An ideal blockchain platform should have fast read/write speeds, which would result in low transaction times and low block-processing times, low transaction costs, scalability, security, paths for migrations of legacy systems, and easy management of data access and authorizations. The existing blockchain platforms have difficulties meeting these requirements, especially in cases involving computationally intensive smart contracts, which are digital programs implemented in executable computer codes that run on blockchains. Such platforms often lack the efficiencies and security required for scalability. In addition, existing blockchain platforms, e.g., Bitcoin's blockchain platform, with linear blockchain format and limited capacity, may be unsuitable for applications using large amounts of data, such as in enterprise data applications.

Another drawback of many prior art blockchain systems is their dependence on the use of public-private key as a means for storing and accessing data records.

Another drawback of many prior art blockchain systems is their limited ability to perform parallel processing, which in turn limits the speed at which transactions can be finalized.

Another drawback of prior art blockchain systems is their limited ability to provide data-access control for various levels of authorized users.

Another drawback of prior art blockchain systems is their reliance on off-blockchain processes that are needed to arrive at a blockchain entry. This results in a trade-off between the expense and difficulty of showing the work (calculations used to arrive at the entry) on the blockchain versus the lack of accountability when the work of coming to consensus is done off-chain.

What is needed is a blockchain system and method that overcomes the above identified problems of the prior art.

For example, what is needed is a blockchain system and method that can handle large amounts of data without incurring significant costs or sacrificing security.

What is also needed is a blockchain system and method that provides easy management of data access and authorization without sacrificing security.

What is also needed is a blockchain system and method using data blocks that are not limited in the amount of data they can carry, i.e., they are not spatially limited.

What is also needed is a blockchain system and method that has fast read/write speeds.

What is also needed is a blockchain system and method that has low transaction costs.

What is also needed is a blockchain system and method that provides scalability.

What is also needed is a blockchain system and method that provides paths for migrations of legacy systems without sacrificing security.

SUMMARY

Unlike the prior art systems, which are organized around blockchain's fixed-size blocks, the present invention provides a system and method that is organized around digital identities (identifiers) and their blockchain accounts. Each account is treated as an independent blockchain and managed as a continuously growing Stateful Merkle Tree ("SMT") while the blocks are treated as temporal synchronization points for all the chains in the network, thus removing spatial constraints on a data-block size present in prior art blockchains. Indexing of the blocks allows the invention to operate at more than one synchronization frequency. For example, the system can have 1-second blocks (minor blocks) for transaction finalization and 12-hour blocks (major blocks) for preservation of the historical ledger. Shorter block times are constrained by the speed at which the node consensus layer can validate transactions. Longer block times require less state and allow mobile devices, which may have less memory or processing capabilities, to work as lite nodes that can validate a subset of transactions relevant to an account owner. Multiple minor blocks over a duration of a single major block can be integrated into one major block.

The present invention provides a system for identity management capable of modeling complex organizational structures and relationships. This makes the invented system and method ideal for integration with various other blockchain platforms, improving accessibility of prior art blockchain platforms in a more diverse variety of applications.

The present invention allows for tracking of state and validity of smart contracts stored on third-party blockchains implementing Layer-1 protocols known in the art, such as Ethereum, Solana, Tezos, etc. As a result, the invented system is able to process smart contracts written across a variety of Layer-1 protocols, thus managing a multitude of blockchains. For example, the invented system can record and/or enforce a sequencing order of actions executed across distributed systems operating asynchronously, document the state of transactions distributed across multiple systems, record data dependencies resulting from event sequencing, etc.

The present invention also allows for integration with Layer-0 blockchain platforms, such as Cosmos and Polkadot, which aim to connect multiple existing unique blockchain platforms for making transactions across different protocols efficient. The present invention can be used to manage a transferred asset under a blockchain account of the buyer and to continue to track the asset's movements across multiple blockchain accounts.

The present invention also moves away from the prior art paradigm of 1:1 relationship between a key and an asset, thus decoupling the concept of user's identity from security and allowing for fast response to security breaches. The invention allows for moderated (managed) and delegated authorizations for access and use. As a result, even if an account's private keys are compromised, an organization can set its own authority of trusted individuals to prevent an incorrect transfer. This is especially useful in cases where an asset is repeatedly transferred across various blockchain platforms under an increased risk of private keys becoming exposed.

The present invention provides for optimized parallel processing, linear scaling, and efficiency of state. Parallel processing is achieved by partitioning a blockchain network into multiple validator networks that process transactions for only a fraction of blockchain accounts. Additional validator networks can be added to linearly scale the network as system usage increases. Efficiency of state is realized through the use of a chain-of-chains architecture that organizes transactions into hierarchies of summary hashes and allows a user to validate transactions on devices having limited data and processing capabilities, such as on mobile devices, e.g., mobile phones.

The invention further uses synthetic transactions for inter-chain communications.

In one embodiment, the invention further uses scratch accounts for efficient managing of consensus.

In one embodiment, the invention further uses key books and key pages for easy management of credentials and access.

The present invention also uses scratch blockchains, which are chains with data of limited availability that can be purged after a predetermined period of time.

In one embodiment of the present invention, a blockchain system includes a hardware processor and a memory device storing instructions. When executed by the hardware processor, the instructions, which are stored in the memory, generate a blockchain organized as a merkle tree having a continuously (continually) increasing number of leaves, the merkle tree spanning a plurality of consecutive temporal blocks of a predetermined duration, wherein an end of each consecutive temporal block of the plurality of consecutive temporal blocks constitutes a corresponding reference point, and wherein a first plurality of roots of non-overlapping subtrees of the merkle tree summarizes a cumulative state of the blockchain at a particular temporal block's reference point.

In one embodiment of the invention, a root of the first plurality of roots is also a member of a second plurality of roots of non-overlapping subtrees of the merkle tree, the second plurality of roots summarizing a cumulative state of the blockchain at an earlier temporal block's reference point. In one embodiment, the earlier temporal block immediately precedes the particular temporal block whose state is summarized by the first plurality of roots.

In one embodiment of the above-described blockchain system, all of the temporal blocks of the plurality of temporal blocks have an equal duration. In another embodiment of the above-described blockchain system, all of the temporal blocks of the plurality of temporal blocks have an unequal duration.

In one embodiment of the above-described blockchain system, the first plurality of roots differs from a second plurality of roots of non-overlapping subtrees of the merkle tree that summarizes a cumulative state of the blockchain at an earlier block's reference point. The first and second pluralities of roots may differ in a number of roots, in the roots (root values) themselves, or both. For example, the first plurality of roots and the second plurality of roots may have the same number of roots, but may have at least one root of the equal number of roots that is different.

In one embodiment, a method of the present invention generates a blockchain. The method includes the steps of receiving, on a continuous (continual) basis, hashes representing blockchain transactions; appending the received hashes in an order of arrival as leaves of a continuously growing merkle tree; receiving a plurality of temporal reference points over a period of time; and upon receipt of each temporal reference point, deriving a separate plurality of roots of non-overlapping subtrees of the merkle tree (note: the resulting separate pluralities of roots may or may not be different from each other), wherein each derived plurality of roots of non-overlapping subtrees of the merkle tree creates a respective proof of a cumulative state of the blockchain at the corresponding temporal reference point. Two successive temporal reference points define a blockchain block.

In one embodiment of the invented method, a root of a first plurality of roots corresponding to a first temporal reference point is also a member of a second plurality of roots corresponding to a second temporal reference point. The second received temporal reference point may immediately precede the first received temporal reference point.

In one embodiment of the invented method, the temporal reference points are received at a constant frequency. In another embodiment, the temporal reference points are received at a variable frequency.

In one embodiment of the invention, in a blockchain system having an identity-based blockchain account including a primary chain, a secondary chain, and at least one key book applying to the identity-based blockchain account, the at least one key book having a key page, an invented method includes the steps of: recording a multi-signature transaction originating from the identity-based blockchain account in the secondary chain; associating the multi-signature transaction with the key page of the at least one key book, the key page including (i) a signature-authorization rule, and (ii) a plurality of keys corresponding to a plurality of transaction authorizers; recording, in the secondary chain, an authorization of the multi-signature transaction from a transaction authorizer of the plurality of transaction authorizers; and once a number of authorizations recorded on the secondary chain satisfies the signature-authorization rule, recording the multi-signature transaction on the primary chain for execution.

In one embodiment of the invented method, each key of the plurality of keys of the key page of the at least one key book includes one of (i) a hash of a transaction authorizer's public key, and (ii) a designation of a key-book authority.

In one embodiment of the invented method, the identity-based blockchain account belongs to a first digital identity, and the designation of a key-book authority identifies one of (i) a supplemental key book belonging to the first digital identity, and (ii) an external key book belonging to a second digital identity.

In one embodiment of the invented method, the supplemental key book belonging to the first digital identity includes a first manager key book for authorizing the multi-signature transaction based on a first characteristic of the multi-signature transaction and a second manager key book for authorizing the multi-signature transaction based on a second characteristic of the multi-signature transaction.

In one embodiment of the invented method, the external key book belonging to a second digital identity is identified via a uniform resource locator (URL) address.

In one embodiment of the invented method, the external key book belonging to a second digital identity authorizes the multi-signature transaction based on a set of rules of the second digital identity, thereby enabling an off-chain validation of a smart contract.

In one embodiment of the invented method, the at least one key book includes a primary-layer key book and a secondary-layer key book, wherein the secondary-layer key book enhances security of the identity-based blockchain account.

In one embodiment of the invented method, the key page is configured to allow replacement of at least one key of the plurality of keys, thereby enabling a dynamic key management.

In one embodiment, an invented blockchain system has an identity-based blockchain account including a primary chain, a secondary chain, and at least one key book applying to the identity-based blockchain account, the at least one key book having a key page. The system includes: a hardware processor; and a memory device storing instructions. When the instructions are executed by the hardware processor, they cause the processor to: record a multi-signature transaction originating from the identity-based blockchain account in the secondary chain; associate the multi-signature transaction with the key page of the at least one key book, the key page including (i) a signature-authorization rule, and (ii) a plurality of keys corresponding to a plurality of transaction authorizers; record, in the secondary chain, an authorization of the multi-signature transaction from a transaction authorizer of the plurality of transaction authorizers; and once a number of authorizations recorded on the secondary chain satisfies the signature-authorization rule, record the multi-signature transaction on the primary chain for execution.

In one embodiment of the invented system, each key of the plurality of keys of the key page of the at least one key book includes one of (i) a hash of a transaction authorizer's public key, and (ii) a designation of a key-book authority.

In one embodiment of the invented system, the identity-based blockchain account belongs to a first digital identity, and the designation of a key-book authority identifies one of (i) a supplemental key book belonging to the first digital identity, and (ii) an external key book belonging to a second digital identity.

In one embodiment of the invented system, the supplemental key book belonging to the first digital identity includes a first manager key book for authorizing the multi-signature transaction based on a first characteristic of the multi-signature transaction and a second manager key book for authorizing the multi-signature transaction based on a second characteristic of the multi-signature transaction.

In one embodiment of the invented system, the external key book belonging to a second digital identity is identified via a uniform resource locator (URL) address.

In one embodiment of the invented system, the external key book belonging to a second digital identity authorizes the multi-signature transaction based on a set of rules of the second digital identity, thereby enabling an off-chain validation of a smart contract.

In one embodiment of the invented system, the at least one key book includes a primary-layer key book and a secondary-layer key book, wherein the secondary-layer key book enhances security of the identity-based blockchain account.

In one embodiment of the invented system, the key page is configured to allow replacement of at least one key of the plurality of keys, thereby enabling a dynamic key management.

BRIEF DESCRIPTION OF THE FIGURES

The accompanying figures, where like reference numerals refer to identical or functionally similar elements throughout the separate views, together with the detailed description below, are incorporated in and form a part of the specification and serve to further illustrate embodiments of concepts that include the claimed invention and explain various principles and advantages of those embodiments.

Figure 1:
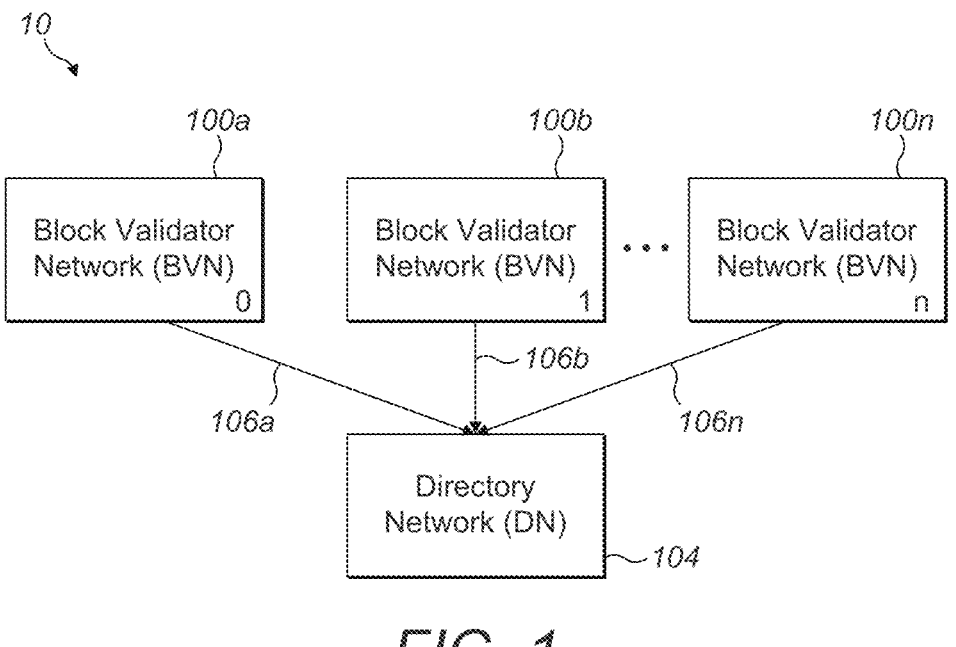
FIG. 1 shows a system in accordance with some embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The following detailed description discloses some embodiments of the system and method of the present invention.

The invented blockchain system and method implements an architecture that revolves around digital identities, where each digital identity can have a number of blockchain accounts.

FIG. 1 shows a system in accordance with some embodiments of the present invention. The system 10 comprises one or more block validator networks ("BVNs"), illustrated as BVN0 reference 100a. BVN1 reference 100b, through BVNn reference 100n that validate transactions for blockchain accounts. Each account is assigned to a particular BVN, and each BVN can process transactions for thousands or tens of thousands of accounts. Each BVN constitutes a network of Tendermint nodes, known in the art, that can replicate different functions in a blockchain in a consistent and secure fashion. Adding more BVNs to the system allows it to scale up linearly as utilization grows.

Each BVN produces its own root hash that is transmitted to a directory network ("DN") 104 via the BVN's respective communication link 106a, 106b through 106n. The DN produces a final root hash that can be "anchored" into another blockchain platform, such as a Level-1 blockchain (e.g., Bitcoin, Ethereum, etc.), by inserting the final root hash as data contained within a transaction. Anchoring can provide the security of a larger network at a cost that is independent of the number of transactions. For example, a DN final root hash derived from 10,000 transactions can be anchored into a Bitcoin blockchain at the cost of a single Bitcoin transaction.

Figure 2:
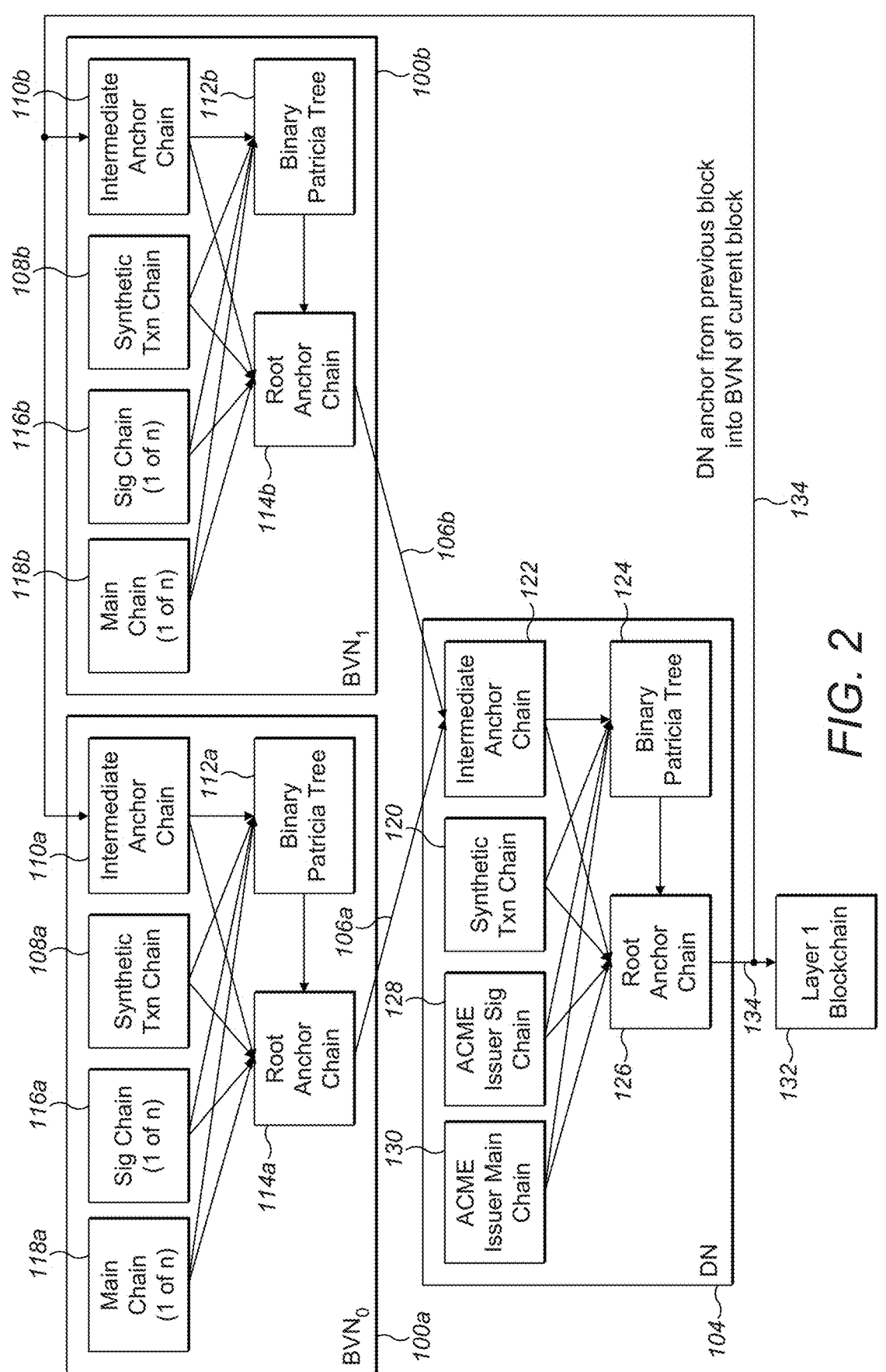
FIG. 2 is an expanded partial view of the system in FIG. 1, in accordance with some embodiments of the present invention.

FIG. 2 is an expanded partial view of the system in FIG. 1, in accordance with some embodiments of the present invention. Specifically, for ease of explanation. FIG. 2 shows only two blockchain validator networks, $BVN_0$, reference 100a, and $BVN_1$ reference 100b. Inside the DN 104 and each BVN 100a and 110b is an interconnected network of chains responsible for synchronizing nodes within the BVN, communicating between BVNs, collecting roots, collecting signatures, and anchoring roots to other blockchains.

Each BVN includes a Synthetic Transaction chain, an Intermediate Anchor chain, a Root Anchor chain, and a Binary Patricia tree ("BPT"), the latter being known in the art. In addition, for each account, each BVN further includes a Signature chain, and a Main chain, the latter used for recording signed and validated transactions. (This is depicted by the label "1 of n" inside the "Signature chain" and "Main Chain" rectangles in each BVN in FIG. 2. Note, character "n" in the label "1 of n" indicates a number of accounts handled by a single BVN and is different (independent) from the number of BVNs in the system.) The Signature chain and Main chain can be collectively referred to as account chains, as each one is tied to a specific account. The Synthetic Transaction chain, Intermediate Anchor chain, and Root Anchor chain can be collectively referred to as system chains, as they are not tied to any specific account and are used by the system as a whole.

The Signature (Sig) chain of each account in a BVN collects signature(s) for transactions for which the account serves as the source account. In one embodiment, signatures are collected for a predetermined period of time. If a transaction has not met its signature threshold(s) within the predetermined period, for example 2 weeks, the transaction is discarded.

The Main chain of each account in a BVN records transactions that originate from or modify the account, once such transactions have met the signature threshold(s) and have been executed.

The Synthetic Transaction chain in each BVN handles transactions that are produced by the system when a transaction needs to update accounts across multiple identities in different BVNs. The synthetic transaction chain provides cryptographic proof that a synthetic transaction was actually produced by a particular BVN.

The Binary Patricia tree ("BPT") chain collects hashes representing the current state and history of every account in the BVN or DN. As is known in the art, BPT is a special variant of a binary search tree in which rather than explicitly storing every bit of every key, the tree nodes store only the position of the first bit which differentiates two sub-trees. During traversal, the search algorithm examines the indexed bit of the search key and chooses the left or right sub-tree as appropriate.

The Root Anchor chain collects an anchor (summary hash) once per block from every account chain (Signature chain and Main chain) and from every system chain updated during the block. While the invention is not limited in the number of different block-durations used, in one preferred embodiment the system uses two types of blocks: 1-second blocks (referred to as minor blocks) and 12-hour blocks (referred to as major blocks). For every major and minor block, the Root Anchor chain produces a root hash (final root hash) for its respective BVN or DN. The root hash of the DN is the root hash of the entire network.

As shown in FIG. 2, $BVN_0$, reference 100a, includes a Synthetic Transaction chain 108a, an Intermediate Anchor chain 110a, a Binary Patricia tree 112a, and a Root Anchor chain 114a. In addition, for each account inside $BVN_0$, the BVN further includes a separate Signature chain 116a and a Main chain 118a. Similarly, $BVN_1$, reference 100b, includes a Synthetic Transaction chain 108b, an Intermediate Anchor chain 110*b*, a Binary Patricia tree 112*b*, and a Root Anchor chain 114*b*. In addition, for each account, BVN₁ further includes a Signature chain 116*b* and a Main chain 118*b*.

The DN, reference 104, includes a Synthetic Transaction chain 120, an Intermediate Anchor chain 122, a Binary Patricia tree 124, and a Root Anchor chain 126. In addition, DN also includes a token (herein referred to as "ACME") issuer Signature chain 128 and a token (ACME) issuer Main chain 130. FIG. 2 shows DN 104 connected to a Layer-1 blockchain 132 for anchoring the final root into the Layer-1 blockchain via a network link 134. FIG. 2 also shows that a final anchor from the DN 104 from the previous blockchain-block becomes an entry into intermediate anchor chains of BVNs, the Intermediate Anchor chain 110*a* of BVN₀ and the Intermediate Anchor chain 110*b* of BVN₁ via link 134.

Within a BVN, every chain is anchored into the BVN's Root Anchor chain (see 114*a* and 114*b*). An anchor is a root hash that is used as an entry into some other chain. The Root Anchor chain of each BVN is in turn anchored into the DN's Intermediate Anchor chain 122 via its corresponding network link, illustrated in FIG. 2 as links 106*a* and 106*b*. Within the DN 104 every chain is anchored into the DN's root anchor chain 126. The root anchor chain 126 of the DN 104 in turn can be anchored into a Layer-1 blockchain 132 via link 134. Because the DN's Intermediate Anchor chain 122 is anchored into the DN's Root Anchor chain 126, every BVN, and thus every account in the network, can be considered as a side chain of the DN. Those of ordinary skill in the art will readily recognize that there are many alternative ways to organize hierarchies of summary hashes, potentially involving a different number of intermediate steps (partial summary hashes). As long as all the information in the blockchain is fed into this hierarchy, the final root bash (final anchor) will summarize the state of the entire network.

Each of the above-described chains is organized as a continuously growing SMT from which a root hash, or anchor, can be produced every blockchain block, where the block has a predetermined duration. This creates an architecture where every chain within a BVN, or the DN, can be considered a side chain of its respective BVN, or DN, root anchor chain. A key/value pair, representing the state of an account is constructed for each account and added into the BVN's or DN's respective Binary Patricia Tree. Thus, the Binary Patricia Tree records the current state of the network.

Digital Identifier and Accounts

The invented blockchain system and method implement an architecture that revolves around digital identities. Digital identities give users access to the full range of features provided by the system, including smart contracts, off-chain consensus building, and dynamic key management. Each digital identity can have a number of blockchain accounts. Below are some of the account types that are contemplated by the invented system, where participation in the invented system may occur through digital identifier ("DI") accounts and Lite accounts. Lite accounts are "lite" versions of Dis, allowing users to send and receive tokens and maintain a record of their transactions.

Lite Token account ("LTA"): This account represents a blockchain address, for example a Uniform Resource Locator ("URL") including a hash of a public key and human-readable suffix denoting the token type held by the account. This type of account is used for sending and receiving tokens. The token type and authorization scheme for an LTA may be specified by the user. In one preferred embodiment, the token type and/or authorization scheme cannot be changed after the account has been created. A user could, however, create multiple LTAs in his/her digital wallet to manage different tokens.

Lite Data account ("LDA"): This is a public data account that can be used for collaboration. These accounts do not specify keys. Anyone who knows the URL of an LDA could append data entries. In one preferred embodiment, however, data entries cannot be overwritten.

Except for the LTA and LDA accounts, all other accounts belong to a digital-identifier-account type called DI. DI accounts are versatile accounts that perform many of the same functions as Lite accounts in addition to being able to issue their own tokens, stake native ACME (cryptocurrency) tokens as known in the art, participate in complex authorization schemes, and manage other accounts. Most of these operations may be enabled by hierarchical sets of keys, including key books and key pages. In one embodiment, DI accounts may be purchased using credits, which are non-transferable utility tokens with a fixed U.S. dollar value that are created when ACME tokens are burned (made permanently unspendable). Credits may be used to pay for such operations as token issuance, account creation, and key updates.

Below are examples of the different DI accounts.

Digital Identifier Token account ("DITA"): This account type holds and exchanges tokens. Each DITA account belongs to its specific DI.

Digital Identifier Data account ("DIDA"): This is an account that records data entries. Similar to DITA-type accounts, each DIDA account belongs to its specific DI.

DI Key Book account: This account secures other accounts and provides advanced key management. Each Key Book account belongs to its specific DI.

DI Key Page account: this account organizes keys within a key book.

DI Scratch account: This can be DITA or DIDA with limited data availability. In other words, transactions older than a predetermined period, e.g., two weeks, could be removed.

An LTA includes an identity and token URL. In one preferred embodiment, the system may automatically derive the identity by concatenating a hash value, produced by a hashing algorithm, and checksum of a user's public key. The token URL (e.g., bob/token) may be specified by the user and appended to the identity. An LTA may be created by the first transaction sent to the LTA's URL. Such transaction may originate from an exchange or from an external wallet (e.g., Metamask). When the system receives the transaction, it may automatically create a Lite account if the URL is valid and if the account does not already exist. The user may pay in fiat currency (e.g., U.S. dollars) or in Bitcoins (BTC) to an exchange, which would then send tokens from the exchange's LTA or DITA to the URL specified by the user. To spend tokens in an LTA (origin LTA), a user may initiate a transaction, hash the transaction and sign the hash of the transaction with their private key, attach their public key, and submit the resulting information to the invented network system. The network would hash the public key and compute a checksum, verify that the concatenated hash and checksum are identical to the origin LTA provided by the user, then decrypt the signature with the user's public key and verify the withdrawal. In another embodiment, instead of signing the hash of the transaction, the user may sign, with their private key, the transaction itself.

Lite Data Accounts may be created via a similar mechanism. Unlike token accounts, however, LDAs are only capable of writing data. Because LDAs do not specify keys, anyone with the address of the LDA is able to write data to the account.

Following is an embodiment of creating a URL for a Lite account. Although this embodiment uses the SHA-256 bashing algorithm, other hashing algorithms known in the art could also be used.

In generalized form, the URL format of a Lite account may be described as:

acc://<keyHash><checkSum>/<tokenURL>

In one embodiment, the <keyHash> is the first 20 bytes of the SHA-256 hash of the account's public key encoded as hexadecimal and represented as lowercase text; and <checkSum> is the last 4 bytes of the SHA-256 hash of the lower case <keyHash>, also in hexadecimal (i.e., hash value in hexadecimal converted to lowercase text characters).

The following example illustrates the process of creating a Lite ACME token Account from a user's public/private key pair. Assume the user has the following private/public keys: PrivK:

b270eaaa57e5d4d808a9766f64b340aa655481c2
    98288238e5b1b3561fb80b27
    PubK:    023e6165e349c2822089ab042b3a885ca54a0907
    e237e8bfb5bd2aa96885966f35

Computing the SHA-256 hash of the public key, H (PubK), produces the following value:

818D7CIF69E7BEBCE54FE087F44D86DI4279100
    D2EEA690AC3847AEIB9A14237

Trimming this hash to the first 20 bytes (which has the odds of a random match of 1 to $10^{48}$) and converting the trimmed hash to lower case results in the following character string.

H'                                      (PubK):
    818d7c1f69e7bebce54fe087f44d86d14279100d Computing checksum (last 4 bytes of the SHA-256 hash of trimmed hash) and converting the value to lower case results in the following character string.

C(H'(PubK)): 904a336d

Concatenating the H'(PubK), the C(H'(PubK)), a slash, and the token URL results in the following URL address.

URL: acc://818d7c1f69e7bebce54fe087f44d86d1427910
    0d904a336d/acme

With the length of an LTA being 48 characters, where the hash of the public key occupies 40 characters and the appended checksum adds an additional 8 characters, the length of an LTA URL becomes 49 characters (including 1 character for the slash) plus the length of the token URL. Although the above example uses "acc://" as a prefix, the system may use other prefixes, as long as they do not conflict with the schema prefix used by other systems, such as the "http://" and "https://" prefixes used by the World Wide Web.

Appending a checksum to the hash of the public key prevents the irreversible loss of tokens if the public-key hash is copied incorrectly or derived from another algorithm. When a server in the invented system receives a transaction, it converts the LTA identity into bytes (two hexadecimal characters per byte), takes the first 20 bytes (40 lowercase hexadecimal characters) representing the key hash, recalculates the checksum from the first 40 hexadecimal characters, and verifies that they match. If the checksum is incorrect, the transaction fails, and the tokens are returned to the sender. This process functions as a built-in verification mechanism, which is useful for destination LTAs, since they do not include human-readable text and, therefore, are easier to mistype.

In one embodiment, DIs may be created by a sponsor through spending of credits issued by the invented network system. A user without a DI to use as a sponsor could buy ACME tokens, create a Lite account for ACME tokens, purchase credits on the invented network, and sponsor the creation of their own DI. They could then use their DI to sponsor the creation of additional DIs for themselves and others. The invention contemplates having each account be uniquely identified by a URL.

In one preferred embodiment, DIs are URL-based digital identifiers with hierarchical key sets that can manage data, tokens, and other identities. They may also be used to govern more complicated operations such as token issuance, off-chain consensus building, and complex authorization schemes (e.g., multi-signature authorizations).

In addition to DI and its accounts described above, the invention contemplates using a sub-digital identity ("sub-DI"), which is an Nth generation DI that is created within another DI. In one embodiment, the invention uses a DI Token Issuer element to define a type of token that can be issued to DI token accounts and Lite token accounts. The system may also use a cataloguing structure, called directory, that organizes sub-DIs and accounts without managing their contents. Identity hierarchies are useful for organizing objects, which might include different token types held by a user, different departments within an organization, or different data types collected by an array of Internet-of-Things ("IoT") sensors, etc.

Any number of accounts and sub-DIs may be nested within a DI. Accounts and sub-DIs are independent from each other and possess their own sets of keys with which they can manage their assets. The parent DI possesses an administrative key set that may add, delete, transfer, or modify the security of its accounts or sub-DIs. The sub-DIs and accounts may be nested within another sub-DI. In one embodiment, data and token accounts are terminal, i.e., they cannot have nested accounts.

DI Data and Token Accounts: DI Data and Token accounts may have, for example, the following general format:

<prefix>://<DI>/<directory>/<account> where the "prefix://" specifies the blockchain platform, DI specifies the top-level digital identity in control of the URL, directory specifies a particular type of account, and account specifies data or tokens. Table 1 below provides several examples of data and token accounts for the hypothetical bank with DI "bank", using "acc://" as the prefix. In the invented system, both cryptocurrencies and tokenized assets may be considered token accounts.

TABLE 1

| DI | acc://bank | acc://bank |
| --- | --- | --- |
| Description | Data | Tokens |
| Directory | d | t |
| Account-1 | acc://bank/d/accounts | acc://bank/t/loans |
| Account-2 | acc://bank/d/investments | acc://bank/t/securities |
| Account-3 | acc://bank/d/transactions | acc://bank/t/realestate |
| Account-N | acc://bank/d/N$^{th}$ | acc://bank/t/N$^{th}$ |

Directories, which are optional, can be useful in enterprise applications involving a greater organization of larger numbers of accounts and sub-DIs. Directory label may be defined by the user and may be single-character or multi-character. Although in the examples provided, single-character directory labels, d for data, t for tokens, and i for identities are shown, a hypothetical investment firm with DI "firm" may create data accounts with directories r for residential and c for commercial properties, while a non-fungible token (NFT) art collector or a cryptocurrency trader may create token accounts with directories NFT and stable to denote NFTs and stablecoins. In other words, any directory label may be used. In one preferred embodiment, however, a directory label may not be changed after it is created.

When a sub-DI includes non-terminal accounts, any number of sub-DIs could be nested within another sub-DI, which could extend indefinitely in both vertical and horizontal directions. This allows a user to create a custom directory structure to model anything from a file directory to a corporate hierarchy. Table 2 below provides an example of different sub-DIs representing departments within a bank.

TABLE 2

| DI | acc://bank |
| --- | --- |
| Description | Identity |
| Directory | i |
| Sub1-DI-1 | acc://bank/i/auditing |
| Sub2-DI-1 | acc://bank/i/auditing/i/director |
| Sub3-DI-1 | acc://bank/i/auditing/i/director/i/manager |
| SubN-DI-1 | acc://bank/i/auditing/i/director/i/manager/i/$N^{th}$ |

In addition, or as an alternative, to creating multiple directories, the present invention allows for data and tokens to be nested within sub-DIs for organizing large numbers of data and token accounts. Table 3 below provides an example of a complex DI, where an investment firm with DI "firm" has a team specializing in residential homes and another team specializing in commercial real estate, with the two teams given different sub-DIs. For simplicity, in Table 3, the combined addresses are referred to as URLs.

TABLE 3

| DI | acc://firm |
| --- | --- |
| Description | Variable |
| Directory | Variable |
| URL-1 | acc://firm/i/residential/d/properties |
| URL-2 | acc://firm/i/commercial/i/office/d/properties |
| URL-3 | acc://firm/i/commercial/t/securities |

If an account is terminal, it will not have nested sub-DIs within it. For example, if a data account is terminal, while address "acc://firm/i/residential/d/properties" would be permitted, address "acc://firm/d/properties/i/residential" would not be permitted.

Figure 3:
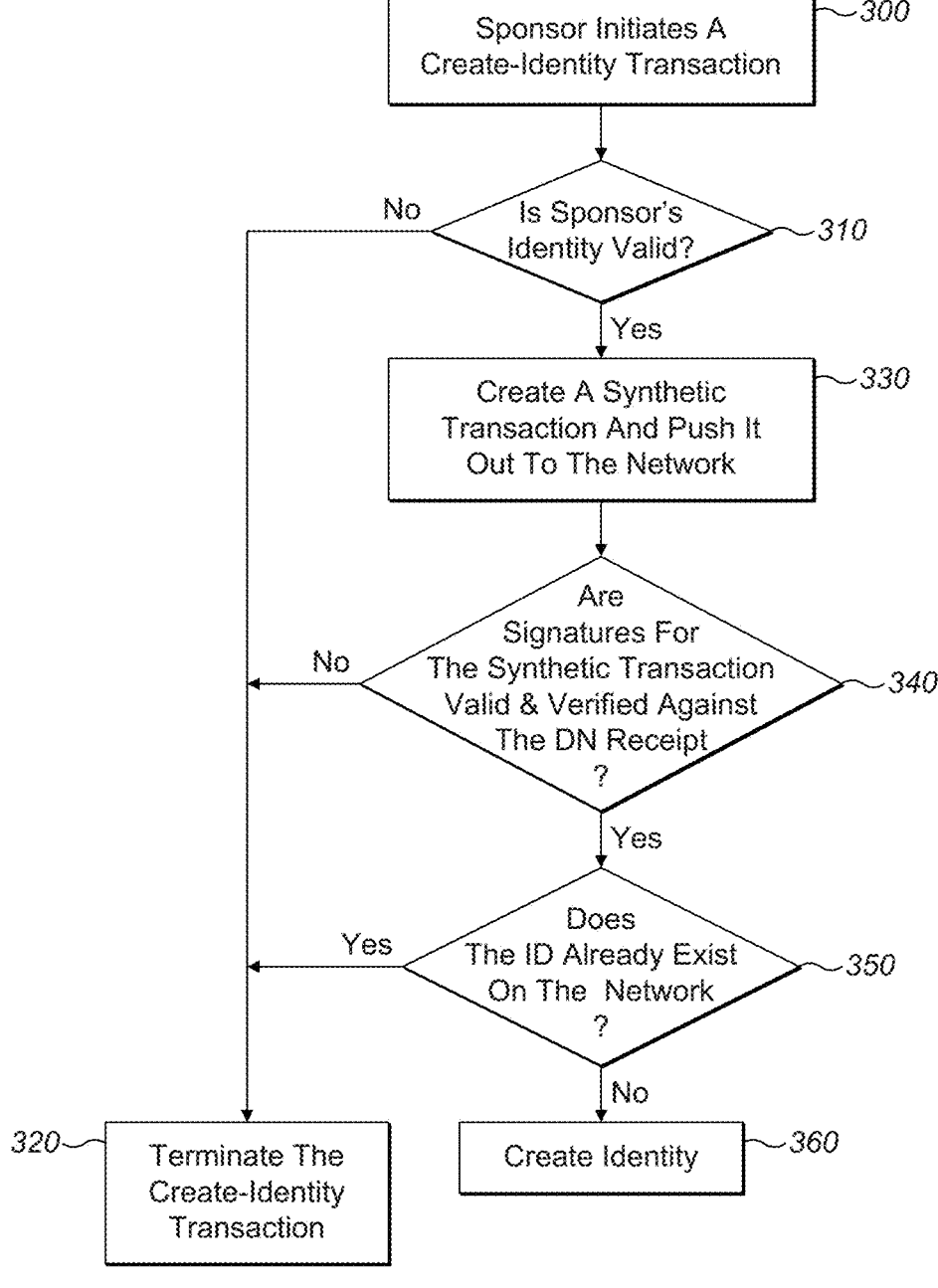
FIG. 3 shows an embodiment of a method for creating an identity object on the invented system.

FIG. 3 shows an embodiment of a method for creating an identity object on the invented system. The method starts at Step 300, when a sponsor initiates a "create-identity" transaction on the network. The sponsor can be an organization or a user, so long as they spend the required number of tokens. At Step 310, the validator of the sponsor's DI will check if the sponsor's identity is valid. If the sponsor's identity is determined to be invalid, the create-identity transaction is terminated, as is shown at reference 320. If the sponsor's identity is determined to be valid, the system proceeds to Step 330, at which point the validator creates a synthetic transaction (discussed further below) and pushes the synthetic transaction out to the network, to be processed in a later blockchain block. The BVN network where the identity resides will receive the synthetic transaction from the originating BVN and validate it against the current state of the network. This validation includes two steps, which can be done in any order. For example, in FIG. 3, the first step is shown by reference 340, where the network checks whether the signatures for the synthetic transaction are valid and verified against the Directory Network receipt. If the check in Step 340 fails, the create-identity transaction is terminated, as shown at reference 320. If, however, the check in Step 340 passes, the method proceeds to Step 350, in which the BVN network checks whether the requested identity already exists. If the answer is yes, the create-identity transaction is terminated, as shown at reference 320. Otherwise, the new identity object is created at Step 360.

The invention may use URLs to reference user accounts that are managed by a DI. The URL includes the following characteristics: prefix://DI/Path, where prefix refers to the platform, such as "acc", DI refers to the user's identity, and Path refers to accounts that are managed by the DI. Specifically, DI refers to a Root Identity that is used to route transactions to BVNs. Each account and sub-DI within a Root Identity is handled by one BVN that is determined after deriving a hash, such as using the SHA-256 hashing algorithm, (represented below by H function) of the Root Identity DI. While hashing may be performed on a hexadecimal value of a DI, in one preferred embodiment hashing may be performed on a character value of the DI, designated as "lowercase (DI)".

DIChainId: H(lowercase(DI))

Moreover, in one preferred embodiment, the address may be created by hashing the derived hash a second time, as shown further below.

Both the DI and account may be hashed. For example, the URL acc://RedWagon/AcmeTokens may be internally represented by the following: H(redwagon) and H(redwagon/acmetokens), respectively.

In one preferred embodiment, DIs are evenly distributed among BVNs. Network routing may be determined by a particular sub-set of bits or bytes of the hash value. For example, in one embodiment, network routing is determined by the first eight bytes of the hash, such as SHA-256 hash, of the DI's account identifier. In such a case, as an example, the address corresponding to a particular BVN may be determined by the following:

Address: uint64(H(DIChainId) [0:7]), where [0:7] takes the first eight bytes, and unit interprets those bytes as a number. This results in a random address that can be processed internally and distributed to a particular BVN.

Security and Authorization

The present invention implements security and transaction authorization using Key Books, where each DI includes at least one Key Book. A Key Book specifies a set of public key hashes and Key Book Authorities, the latter representing Key Books of other identities involved in signing a transaction, that are organized and prioritized as Key Pages.

The Key Pages within a Key Book are specified by the user and, in one embodiment, organized in order of priority to manage the Key Book. For example, in one embodiment, the first Key Page may be the highest priority and the last Key Page may be the lowest priority. A user could also specify any number of Key Books from external DIs as the owners of any number of Key Pages within their Key Books. This way, external Key Books could participate in transactions within the Key Book of another DI. Each Key Page may have one or more entries, each including a hash of a public key and/or an address, e.g., URL, of a Key Book Authority.

Following, are examples of the operations that could be used to manage the keys in one embodiment of the invention: (a) creating an additional Key Book within a DI; (b)

creating an additional Key Page within a Key Book; (c) updating the public key hash of an entry in a Key Page: (d) updating a Key Page.

In one embodiment of the invention, the authorization rules for updating the public key hash of an entry in a Key Page may be unique. For example, this particular type of transaction may always be single-signature and could only be used to update the entry corresponding to the signer. If the transaction is signed with a simple signature, then the only entry that can be updated is the one with a key hash that matches the signer. If the transaction is signed with Key Book Authority, then the only entry that can be updated is the one owned by that Key Book Authority. All other modifications of a Key Page may be performed by updating the Key Page using general (non-unique) authorization rules.

In one embodiment, every account specifies a Main Key Book. The Main Key Book of an account may be responsible for securing the account by authorizing signatures of transactions originating from that account.

In one embodiment, when a DI is created, an initial Key Book may be created along with the DI and becomes the DI's Main Key Book. When, thereafter, an account for that DI is created, the Main Key Book within the DI could be used as the account's Main Key Book. Thus, the accounts may be created with the same Main Key Book as the DI to which they belong. While all accounts may be secured by a single Key Book by default, the user may have an option to create a new Key Book for every account.

An account may also include one or more secondary Key Books for additional layers of authorization, e.g., a Manager Key Book for a second layer of authorization. A second-layer Key Book may be set at account's creation, and depending on an embodiment, may or may not be modified thereafter. If an account specifies a second-layer Key Book, e.g., a Manager Key Book, in addition to the Main Key Book, then transactions originating from that account, referred to as managed transactions, must have authorized signatures from both Key Books.

The Key Book system allows applications to tailor the number of signers required for a transaction to occur. For example, some transactions may only require the signature of a single authorized party, some may require a ⅔ majority, while some may require signatures of all involved parties. Each Key Page of a Key Book allows for a custom minimum number of signers to be applied to transactions.

Each Key Page can have a signature threshold. When a Key Page is used to authorize a transaction, whether as part of the origin account's Main Key Book or a second-layer Key Book, the signature threshold can determine how many signatures are required from the keys and/or Key Book Authorities of that Key Page. This can be referred to as m-of-n authorization scheme, where m is the signature threshold and n is the number of entries on a Key Page. This general authorization scheme enables transactions requiring multiple signatures, i.e., multi-signature transactions.

A manager's Key Book may use its own m-of-n authorization scheme to approve or reject a transaction initiated by the Main Key Book. A manager may have multiple keys and, depending on an embodiment, an account may specify either a single manager or multiple managers.

In one embodiment of the invention, a manager is unable to execute a transaction on their own. In such implementations, managed transactions can be used for automated security without custodian control. The following are some of the examples of their use.

Spending limits: A manager may enforce a spending limit, similar to withdrawal limits on automated teller machines.

Frequency limits: A manager may allow only a certain number of transactions per day.

Transaction type limits: A manager may restrict transactions to certain types (e.g., tokens, data, etc.)

Figure 4:
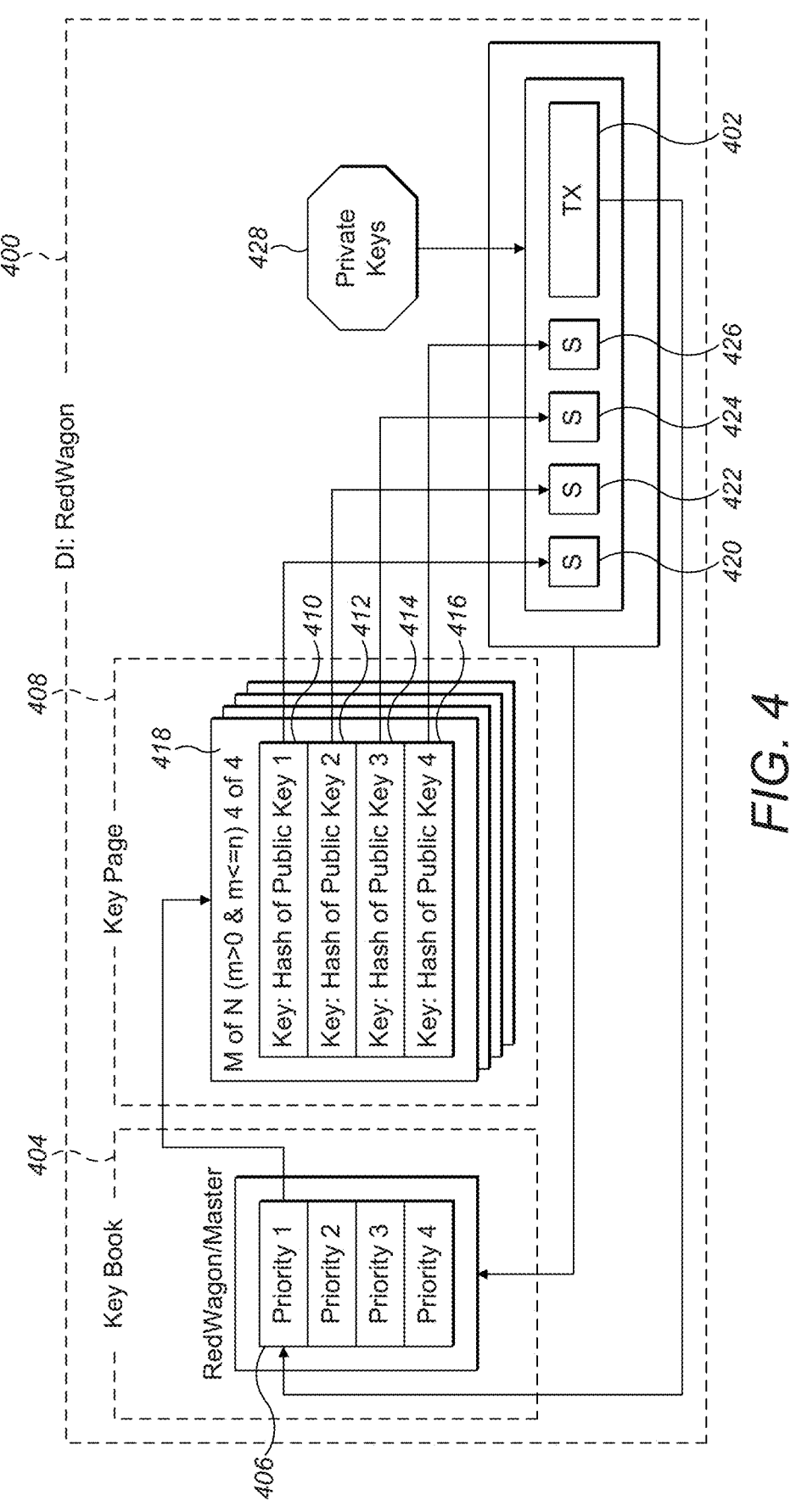
FIG. 4 illustrates a key management scheme of an embodiment of the present invention.

FIG. 4 illustrates a key management scheme of an embodiment of the present invention. In this embodiment, digital identity "RedWagon", shown by reference numeral 400, submits a transaction TX (reference 402) through its Key Book 404, which includes a number of Key Pages corresponding to different transaction-priority levels, from "Priority 1" to "Priority 4." In the example in FIG. 4, the transaction has a "Priority 1" level (reference 406), which corresponds to Key Page 408. Key Page 408 identifies four different keys: hash of Public Key 1 (reference 410), hash of Public Key 2 (reference 412), hash of Public Key 3 (reference 414), and hash of Public Key 4 (reference 416). In addition, Key Page 408 lists 4-of-4 signature scheme (reference 418), which means that, for the transaction 402 to be executed, a threshold of four valid signatures must be reached. In other words, the transaction 402 must be signed by four valid private keys corresponding to the four public keys whose hashes are listed on Key Page 408. This is shown conceptually by signature elements 420, 422, 424, and 426 in the context of Private Keys element 428. Note, as would be readily appreciated by one of ordinary skill in the art, the private keys themselves are typically not stored on the blockchain. If the private keys signing the transaction 402 are valid and the four-signatures threshold has been met, the transaction gets executed.

As indicated above, transactions may be single-signature or multi-signature. Single signature transactions have an m-of-n signature threshold of 1, meaning that only one signature is required to validate a transaction. Single-signature transactions are fast. Due to their simplicity, they are expected to be used for sending and receiving tokens by a majority of users. A signature may be derived from the user's private key and either the transaction's hash or the transaction itself. Thus, a transaction only requires a user to input the amount and destination address, and possibly a memo and the nature of the transaction.

In one preferred embodiment, when a user creates a single-signature transaction, he/she would specify the transaction type (e.g., data, tokens, etc.) and origin account. Each transaction would specify exactly one Key Page in the Key Book of that account, and all signatures would have to come from the keys on that page. If a transaction specifies Key Page 1, for example, and Key Page 1 specifies m=1, then the transaction is validated immediately.

In addition to enabling transaction approval by account authorizers (e.g., managers) within a DI, the invention allows for external authorization(s). Transactions requiring external authorizations are referred to as delegated transactions. This is useful in many applications of blockchain technology, including smart contracts. In the past, however, due to being computationally intensive, smart contracts exhibited many inefficiencies. The present invention overcomes the problem of the prior art by limiting transactions to a static amount of computation, thus ensuring that they take up a known amount of time, space, and energy on the blockchain. With these characteristics, delegated transactions allow for a system of third-party verification analogous to a smart contract while limiting their computational costs.

For example, delegated transactions allow for the transaction's origin account and the signing Key Book to belong to different root identities. This can be done by delegating the signature authority of a key to another Key Book. Specifically, the Key Book of an origin account can include URL address(es) of the external Key Book(s) authorized to sign transactions against that account. A delegated transaction is sent to the signer's BVN first, so that the signature can be authorized against the signer's Key Book and added to the signer's signature chain. Then, the delegated transaction is sent to the origin's BVN to be executed, at which point synthetic transactions are produced if necessary, for example to disburse funds.

Multi-signature transactions have n≥m>1 signature requirements, meaning that the number of signatures required to authorize a transaction is less than or equal to the total number of authorized keys specified by the originator, but always greater than 1. This authorization scheme is useful for adding extra security when transferring valuable assets or coordinating signatures between accounts owned by multiple individuals, groups, businesses, or automated programs with access to a key. One of the main advantages of multi-signature transactions is that multiple points of failure must occur before an account becomes compromised. Below are several examples of the real-world utility of multi-signature authorization:

1-of-2: A joint bank account where the signature of either member is sufficient to access the funds.

2-of-2: Automated spending control in which a computer program with access to a key will only sign for a transaction below a certain amount.

2-of-3: Escrow transactions between two parties, with a third party acting as an intermediary in the event of a dispute.

1 or 3-of-4: Single signature with distributed account backup from trusted parties in the event the owner's key is lost or stolen.

Figure 5:
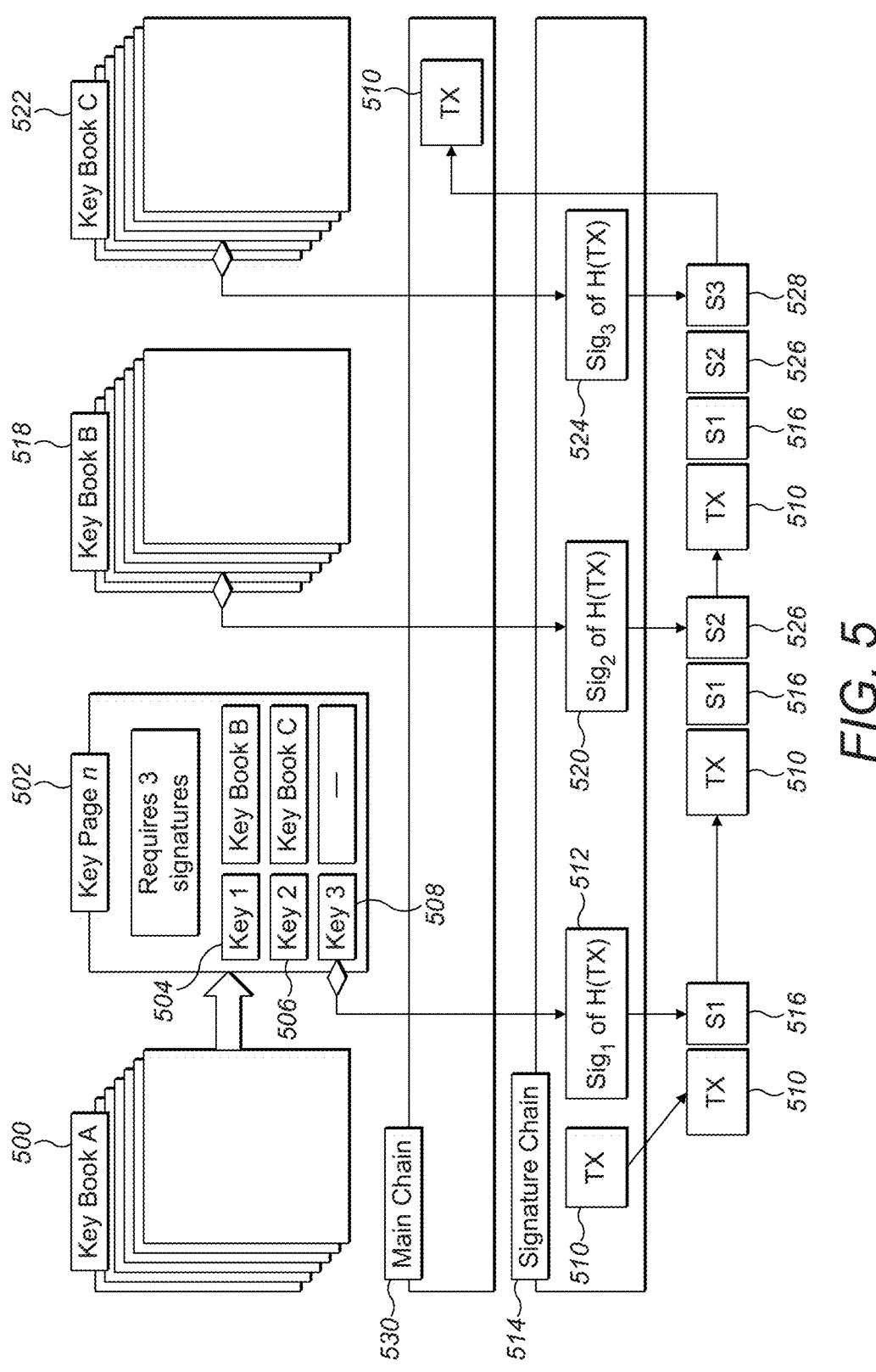
FIG. 5 shows an overview of a multi-signature transaction process in accordance with an embodiment of the invention.

The use of multiple Key Pages and Delegated Transactions allows the present invention to accommodate each of the above scenarios. For example, an individual DI may specify n≥m>1 for a single Key Page and control a multi-signature transaction entirely through its DI. If one or more authority Key Books from external Dis are specified in the Key Page on the origin account, then multiple DIs can participate in a multi-signature transaction through Delegated Transactions. FIG. 5 illustrates this.

FIG. 5 shows an overview of a multi-signature transaction process in one embodiment of the invention. In the figure, Key Book A, reference 500, is the originator of a multi-signature transaction that uses Key Page n (reference 502). The key page is shown as including three keys, Key 1 (reference 504), Key 2 (reference 506), and Key 3 (reference 508). Key Page 502 is shown as requiring all three signatures, meaning that it is using 3-of-3 signature requirement. The transaction TX (reference 510) is initiated from an identity's account with Key Book A, which hashes the transaction and then signs the hash of the transaction with Key 3, resulting in a data structure 512. (Note, in other embodiments, instead of signing a hash of the transaction, the transaction could be signed directly.) In some embodiments, the signature data structure 512 may comprise a hash of the signature. The signature data structure 512 is put on a signature chain 514 of the account. Because Key Book A (reference 500) is the originator of the transaction, and because Key 3 (reference 508) is shown as corresponding to a private key of the originator, the originator's signature is validated by the system immediately. This is shown conceptually by element S: (reference 516). Once Key Book B (reference 518) signs the hash of the transaction (reference 520) with its private key and once Key Book C (reference 522) signs the hash of the transaction (reference 524) with its private key, the system validates each signature, which is shown conceptually by element S2 (reference 526) and S₃ (reference 528). As shown in the embodiment of FIG. 5, once the three signatures have been collected on the signature chain 514, the validated transaction TX (reference 510) is promoted to the account's Main Chain 530.

Transactions with various authorization schemes can be executed depending on whether the Manager Key Book, Main Key Book, or both key books are required to sign a transaction. Specifying both a Main Key Book and a Manager Key Book provides an extra layer of security for user-generated transactions. For example, a DI "Alice" with token account acc://Alice/token may specify Key Book acc://Bob/book as a manager. If a transaction is initiated by DI Alice, then a threshold number of signatures from the specified Key Page in DI Alice and any Key Page of DI Bob is required to validate the transaction. If a manager is specified, but m=0 for a Main Key Book, then a manager could execute transactions that are initiated by the account. This authorization scheme is useful for automating recurring payments (e.g., utility bills). If m=0 for both a Main Key Book and a Manager Key Book, or if a manager is not specified and m=0 for the Main Key Book, then anyone with the account information could execute a transaction. This is useful for data transactions among collaborators.

When a manager is not specified: (a) if m=0, then anyone in the network can execute transactions; (b) if m>0, then anyone can suggest a transaction, but at least one key from the Key Page of the Main Key Book or from any Key Page in an authority Key Book also has to sign.

When a manager is specified: (a) if m=0, then anyone in the network can suggest a transaction but the manager also has to sign it; (b) if m>0, then anyone can suggest a transaction, but the manager and account Key Page also has to sign.

Figure 6:
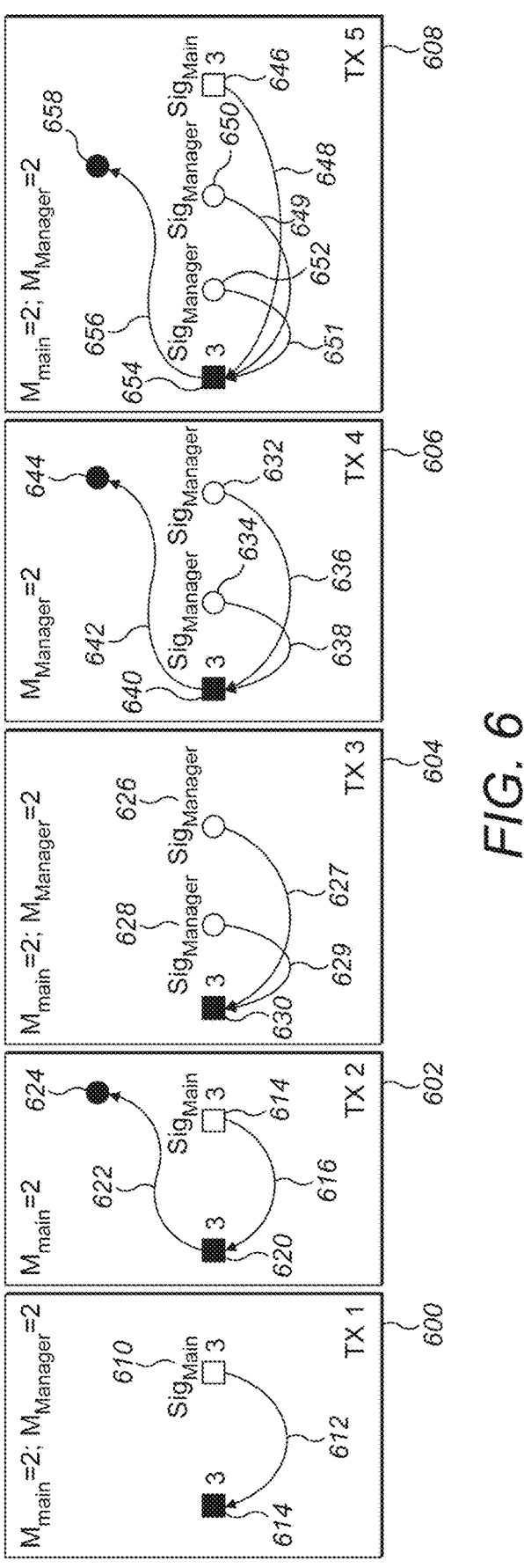
FIG. 6 illustrates a process of signing managed transactions in accordance with an embodiment of the invention.

FIG. 6 illustrates a process of signing managed transactions in accordance with an embodiment of the invention. The figure shows five different transactions TX1 (reference 600), TX2 (reference 602), TX3 (reference 604), TX4 (reference 606) and TX5 (reference 608), where the signature requirement for each is derived from Key Page 3 of its respective Main Key Book.

Transaction TX1, reference 600, is shown as requiring two signatures from Key Page 3 of its Main Key Book and two manager signatures from the Manager Key Book. One of the signatures (submitter's signature) from the Main Key Book is assumed to have been provided at submission time. (Label Sig$_{Main}$ in the figure is the additional signature from the Main Key Book.) Arrow 612 indicates that TX1 was also signed by one additional signature, Sig$_{Main}$ (reference 610), from Key Page 3 of the Main Key Book, resulting in the transaction TX1 (reference 600) being in a state referenced by 614 (illustrated as a black square). However, despite satisfying the two-signature requirement from its Main Key Book, the transaction fails because it lacks manager signatures. Thus, it is not promoted to the account's Main Chain.

Transaction TX2, reference 602, is shown as requiring two signatures from Key Page 3 of its Main Key Book, without any manager-signature requirement. One of the signatures (submitter's signature) from the Main Key Book is assumed to have been provided at submission time. Arrow 616 indicates that TX2 was also signed by one additional signature, Sig$_{Main}$ (reference 614), from Key Page 3 of the Main Key Book, resulting in the transaction being in a state indicated as a black square (referenced by 620). Because there was no manager-signature requirement and because the two-signature requirement from its Main Key Book was satisfied, the TX2 transaction gets promoted (depicted by arrow 622) to the account's Main Chain, indicated by a black dot (reference 624).

Transaction TX3, reference 604, is shown as requiring two signatures from Key Page 3 of its Main Key Book and two manager signatures from the Manager Key Book. One of the signatures (submitter's signature) from the Main Key Book is assumed to have been provided at submission time. Although TX3 is shown as having also been provided with two manager signatures 626 and 628 and has achieved/ attained (conceptually illustrated via arrows 627 and 629, respectively) the state indicated by a black square (reference 630), it still lacks one signature from the Main Key Book. As a result, transaction TX3 fails, and is not promoted to the Main Chain.

Transaction TX4, reference 606, is shown as requiring two manager signatures, without a requirement for signatures from Key Page 3 of its Main Key Book. FIG. 6 shows that the transaction was provided with two manager signatures, 632 and 634, acquiring (via arrows 636 and 638) a state designated by a black square (reference 640). Because there was no requirement for signature(s) from Key Page 3 of its Main Key Book, and because the two manager-signature requirement was satisfied, the TX4 transaction gets promoted (depicted by arrow 642) to the account's Main Chain, indicated by a black dot (reference 644).

Transaction TX5, reference 608, is shown as requiring two signatures from Key Page 3 of its Main Key Book and two manager signatures from the Manager Key Book. One of the signatures (submitter's signature) from the Main Key Book is assumed to have been provided at submission time. Arrow 648 indicates that TX5 was also signed by one additional signature, $Sig_{Main}$ (reference 646), from Key Page 3 of the Main Key Book. FIG. 6 also shows that the transaction was provided with two manager signatures, 650 and 652. Signatures 646, 650 and 652 lead to TX5 acquiring (via respective arrows 648, 649 and 651) a state shown by a black square (reference 654). Because all the signature requirements have been satisfied, the transaction gets promoted (depicted by arrow 656) to the Main Chain, shown by a black dot (reference 658).

Those of ordinary skill in the art will readily appreciate that multiple transactions, originating in the same or different accounts, may execute in parallel, so signatures for different transactions may be interleaved in time. Furthermore, the signing process may take several block periods. Having a signature chain for each account enables the invented system to keep track of the state of the signatures and the transactions more easily.

Stateful Merkle Tree

In the present invention, account chains in a particular BVN are treated as side chains of that BVN's root chain, and the root chain of each BVN is treated as a side chain of the DN's root chain. This enables massively parallel transactions and virtually limitless scalability as capacity is increased via additional BVNs. This chain-of-chains organization, built around accounts rather than fixed-size blocks of the blockchain solves many of the problems of the prior art systems, such as the security-scalability-decentralization trilemma.

Prior art blockchain systems use a balanced Merkle tree with a single root in each blockchain block, where each block may contain hashes for data entries from different accounts. A balanced Merkle tree is typically constructed once and is never modified after its single root has been obtained. In contrast, the present invention treats each account as an independent blockchain and manages it as a continuously growing Merkle tree, referred to as Stateful Merkle Tree ("SMT"), where the blocks are treated as temporal synchronization points for all the chains in the network. Each SMT is an append-only structure, meaning the hashes are added from one side only (e.g., left to right), and a combined hash is added as a parent as soon as two child hashes exist on the same level of the tree.

Due to an irregular frequency at which new (transaction) hashes are added to a blockchain, each account mini-blockchain may contain a variable number of roots within a time delimited block. Thus, SMT's may have multiple roots in different time frames, and are constructed in a way that allows them to grow over time. At any given point in time, the roots of an SMT define the state of its blockchain. This process is illustrated in FIGS. 7A, 7B, and 7C.

Figures 7A, 7B, 7C:
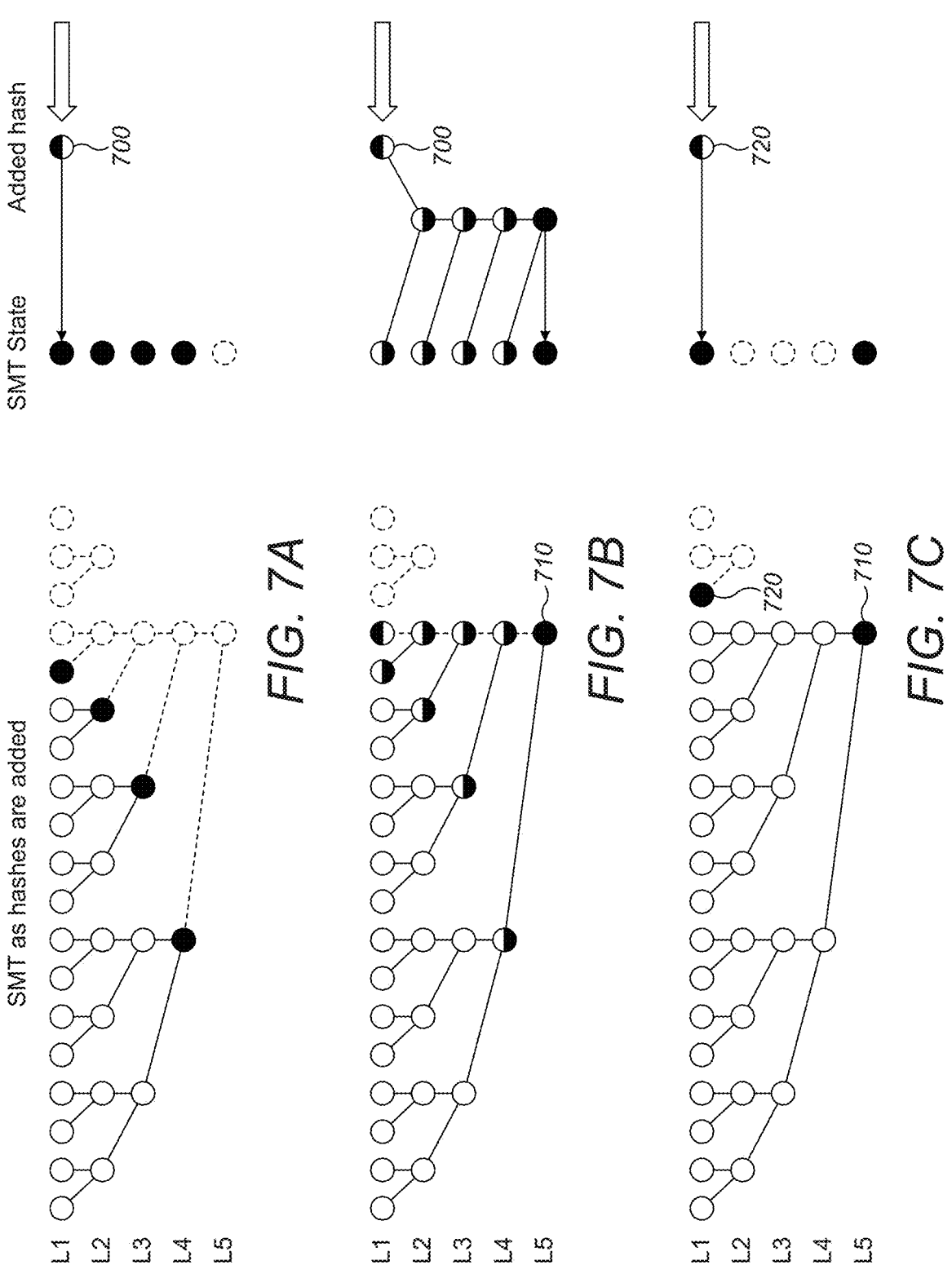
FIGS. 7A, 7B, and 7C show growth and change of state over time of a Stateful Merkle Tree used in the present invention.

FIGS. 7A, 7B, and 7C show growth and change of state of an SMT in the present invention at three sequential instances of time with respect to a hash that is being added to an SMT. The left side of each figure illustrates growth of the SMT as hashes are added to the tree, and the right side of the figure describes the state of the SMT.

In each figure, black-filled dots at various levels (designated by L1 through L5) represent the roots of a particular subtree that define its current state. The circles at level L1 together with any black-filled dot(s) at level L1 represent all the transaction hash entries up to that point in time. The dots with bottom half filled represent the previous roots that defined the previous state of the SMT. The dots with top half filled represent new hashes that are being added to the SMT, i.e., new entries. The dashed circles represent potential future nodes of the tree.

The left side of FIG. 7A shows an SMT with 15 transaction hashes (15 tree leaves), where 4 different root hashes in 4 different subtrees summarize the current state of the tree. This state of the tree is illustrated on the right side of FIG. 7A. The right side of FIG. 7A shows the next hash 700 coming in. Moving to FIG. 7B, when the hash 700 is added to the SMT, the system recognizes that a root hash already exists on level L1 to the left of the incoming hash. The two children are automatically combined to produce a root hash at level L2. The system, however, also recognizes that a root hash already exists on level L2 to the left of the newly created root hash. This process continues until the preexisting root hash on level L4 is combined with the root hash newly created on level L4 to produce a new final root hash 710 on level L5. The resulting SMT is shown on the left side of FIG. 7B. Note, the current state of the SMT at this point can be represented by a single root hash 710. Moving to FIG. 7C, when the next hash 720 comes into the SMT on level L1, because no other roots exist to the left of it, it is treated as a second root hash 730 of the SMT, with the first root hash designated by reference 710. The resulting SMT is shown on the left side of FIG. 7C, and its resulting state is shown on the right side of FIG. 7C.

Those of ordinary skill in the art will readily recognize that an SMT with k leaf hashes will have $log_2 k$ levels. Furthermore, the state of an SMT with k leaf hashes will be represented by a number of roots that is equal to the number of Is (bits with value of "1") in the binary representation of the number k. Thus, the average number of roots required to describe the state of an SMT with k leaf hashes will be $(log_2 k/2)$.

An anchor root of the SMT can be calculated at any point in time. To do so, the rightmost root hash is successively combined with the root hash to the left until a single hash remains. For example, the four root hashes in the SMT in FIG. 7A can be combined into an anchor without adding a new entry. (This aspect of the invention is explained in more detail later.) Since the entire state of the SMT is captured in the latest root hashes, the previous intermediate (non-leaf) hashes can be discarded or "pruned" from the tree to minimize its size. The entry (leaf) hashes can be saved, e.g., in non-blockchain storage or in regular blockchain accounts on the Main Chain, to maintain a historical record of each entry. However, for certain account chains, such as a Signature Chain, entry hashes older than a predetermined period of time, e.g., two weeks, can be pruned from the chain. The process of pruning entry and intermediate hashes on the Signature Chain is explained in the context of Scratch accounts, below.

As a result, the present invention uses SMTs for building and maintaining information in accounts. As new blocks are added the SMTs span multiple blocks. An SMT collects hashes of validated data (e.g., transactions) from multiple sources and creates a Merkle tree that orders all these hashes by their arrival time to the SMT. The arrival order of entries from all sources is maintained in the tree. Each account chain has one SMT associated with it. Each SMT appends, combines and anchors new transaction hashes into its respective Root Anchor chain. This way, SMTs are fed into other SMTs to create the superstructure network in which all accounts that are managed by a particular BVN are anchored into its respective Root Anchor chain, and all BVN Root Anchor chains are anchored into the DN.

Binary Patricia Tree

Binary Patricia Trees are generally designed to create small cryptographic proofs about the particular state of values at a particular point in time, and can be used to prove the balance of an account (i.e., address) at a particular block height in a blockchain. A Binary Patricia Tree ("BPT") is similar to a standard Merkle Tree in that they both hash a set of values that are ultimately combined into a single root. However, BPTs also add a key per entry to create a key-value pair where the key refers to the hash of a chain's address, such as a URL address (e.g., acc://RedWagon/AcmeTokens).

Thus, while an SMT organizes entries by the order in which they are added, a BPT organizes records according to the key of each record. In the present invention, a BPT serves as a cryptographic summary of the current state of every chain within the BVN. It does so by providing cryptographic proofs of the state of a blockchain at a particular block height and by indexing the block where a chain was last modified. As a result, the order in which entries are added to the BPT does not matter. This enables the invented blockchain network to reach consensus quickly, at a frequency of one minor (short duration) block and guarantees that all nodes have the same state. It also creates snapshots of the state of the network, which the nodes can use to get up to date without executing all of the prior transactions.

In one embodiment of the present invention, BPT has two entry types, Node and Value.

Node: Node entries are used to organize the BPT. They have a left path and a right path and exist at a height in the PBT. The height is used to consider a particular bit in the (insertion or search) key. The left path in the tree is taken if the key in question has a bit of value "0" at that point and the right path is taken if the key has a bit of value "1" at that point.

Value: It is the key-value pair in the BPT. Value entries have no children, and paths through the BPT from parent to child node entries must end with either nil or Value entry.

The BPT can update its state to provide proof of the state of the entire system quickly. This ensures that the same entries will always produce the same tree structure and that changing the order in which entries are added to the BPT has no effect on the result. Further, subsets of the BPT are independently and provably correct so long as there is a path from the root of the BPT to one of its subsets.

Because in one embodiment of the invention the keys are the hashes of URL addresses, from a binary point of view they are random. This results in a BPT being well balanced. Although one preferred embodiment of the invention uses leading bits of hash values to organize entries in the BPT, the invention can use any random walk of bits in the key, such as trailing bits, every third bit, etc.

The BPT of the present invention captures account proofs as key-value pairs, where "key" is a hash derived from the account URL, and "value" is the final hash of an account proof. Account proofs are constructed as transient Merkle Trees that take as inputs the hash of the account state and an anchor from each of the account chains. The summary of all key-value pairs is a hash that acts like the Merkle Root of a Merkle Tree. Additions to or modifications of this Merkle Tree-like structure only require localized re-computations, making it easy to update the state of the entire network at the frequency of a minor block.

The organization, membership, and state of chains within an account can be summarized as follows: (a) accounts can act as domains to allow addressing of their Main and Signature chains as a set of URLs; (b) the membership of chains can be proven using SMTs, where all entries in a chain are members of one continuously growing SMT: (c) at any point in time, the membership of the SMT is provable by the SMT state; and (d) BPTs are used to prove the state of every account and chain in a BVN at a particular block height. Those of ordinary skill in the art will readily recognize that there are many ways to implement BPTs. Furthermore, there are multiple ways to create a summary hash of the state of all accounts, possibly using alternative data structures to BPTs and possibly using more or fewer intermediate steps (like the account proofs mentioned above).

The invention is able to maintain proof of state without requiring all elements of that state to be at hand. This allows the invented network to scale efficiently and makes it possible to prove the entire state of accounts relevant to a user with devices having limited memory and processing capacity, e.g., mobile device.

Signature Chain and Main Chain

Each account on the invented system can have multiple chains. For example, in one embodiment of the invention, each account has a separate Signature chain and Main chain. The Signature chain can be responsible for collecting signatures, while the Main chain can be responsible for executing transactions that have met the signature threshold.

All transactions submitted to the invented network may be added to an account's Signature chain. This can include data and token transactions submitted by Lite accounts, data and token transactions submitted by DIs, managed transactions approved by a Manager Key Book, and Delegated transactions submitted by an external Key Book. Single-signature transactions are immediately promoted to the Main chain if the signature included with the submission is valid and corresponds to a key in the origin account's Key Page. Multi-signature transactions are promoted to the Main chain only after the m-of-n signature threshold is reached.

The Signature chain may provide the ability to submit signatures independently of transactions. In one embodiment of the invention, this can be accomplished by hashing the transaction and signing the hash of the transaction with each of the signatures. A hash of each signature on the transaction (i.e., a hash of the signature element resulting from applying a private key to the transaction hash) is added to the Signature chain and provides cryptographic proof that the signatures were obtained. The first person to submit the multi-signature transaction sends the raw transaction along with their signature to create the first signature record. Once the signature threshold is reached, the transaction is promoted to the Main chain.

Signatures can be collected completely on-chain and over a reasonably long timeframe, so that signors can be notified and transactions can be modified. Moving these activities on-chain provides an audit trail of the consensus-building process. The lifetime for signatures and transactions submitted to the Signature chain can be limited to a predetermined time period, e.g., 2 weeks, that can be adjustable. In such a scenario, a transaction will fail if the m-of-n signature threshold is not reached within the allotted time.

The Main chain of an account can permanently store transaction hashes without their signatures because the signatures have already been validated on the Signature chain. The data structure of the Main chain is similar to that of the Signature chain in that each account's main chain is a continuously growing SMT.

In one embodiment of the invention, after each major block (discussed later), entries on the Signature chain older than a predetermined time period can be discarded.

Figure 8:
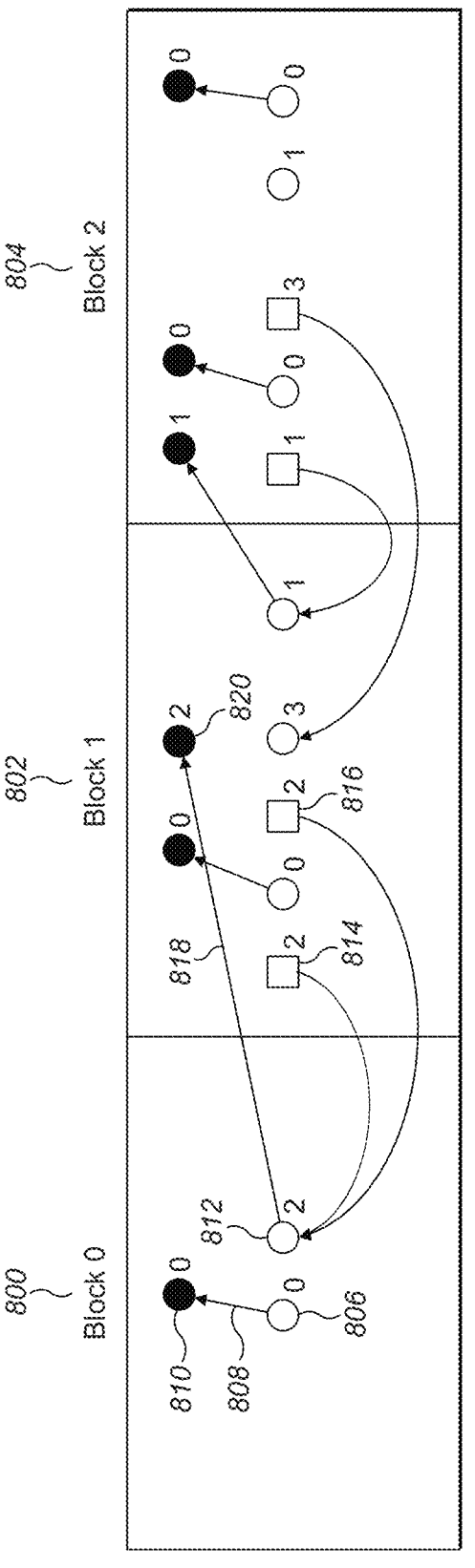
FIG. 8 shows the process of collecting signatures on a Signature chain and promoting the transaction hashes to a corresponding Main chain.

FIG. 8 shows an example of the process of collecting signatures on a Signature chain and promoting the transaction hashes to a corresponding Main chain during various block times. The black dots represent transaction entries promoted to the Main chain. Squares represent signatures on the Signature chain and circles represent transactions with one default signature included, that of the originator. There are four Key Pages within the Key Book of the account, corresponding to four priority levels. Numerals 0, 1, 2, and 3 to the right of each respective circle, square, and dot represent a priority level of a transaction in question, where: Priority 0 specifies 1 key required; Priority 1 specifies 2 keys required; Priority 2 specifies 3 keys required; and Priority 3 specifies 6 keys required. The process is shown over time, as a time-progressing sequence of SMT blocks, from Block 0 (reference 800), to Block 1 (reference 802), to Block 2 (reference 804).

The transaction managed by the Priority 0 Key Page only needs a single signature to satisfy the m-of-n requirement. For example, a transaction with a submitter's signature, designated by reference 806 in Block 0 (reference 800), is identified as being managed by Priority 0 Key Page, thus requiring only a single signature. With the single signature included in the element 806 being valid and corresponding to the key in the origin account's Priority 0 Key Page, the transaction is immediately promoted to the Main chain. This is conceptually shown by arrow 808 moving the transaction 810 to the Main chain.

Reference 812 designates a transaction with the submitter's signature, generated in Block 0, comprising a transaction managed by the Priority 2 Key Page, thus requiring three signatures. The figure also shows that two of the three signatures, 814 and 816, are not provided until Block 1 (reference 802). As a result, the transaction in element 812 is not promoted to the main chain until Block 1. This is conceptually shown by arrow 818 moving the transaction 820 to the Main chain in Block 1 (reference 802). Promotion of other transactions shown in the figure occurs using a similar process. Note, in one preferred embodiment, signatures must be provided from an appropriate Key Page, such that a signature from the Priority 2 Key Page could not sign a transaction from the Priority 3 Key Page.

Scratch Accounts

The invented system allows for the efficiency of the state in validating transactions, collecting signatures, and coordinating consensus. Because a blockchain of the invented system is an SMT with arbitrary synchronization points, transactions may further be compressed into blocks of a longer predetermined duration, e.g., 12 hours, such blocks forming a low-resolution blockchain. Because each account is treated as an independent blockchain, mobile devices can be used as Lite nodes to validate only those transactions that are relevant to an account. Because in one embodiment of the invention the system has a transient Signature chain and a permanent Main chain, signatures can be pruned after a multi-signature transaction is validated. These features can also be combined to create Scratch accounts, a type of account with limited data availability that facilitates inexpensive on-chain consensus between multiple parties and provides cryptographic proof of validation without overburdening the blockchain.

DI data accounts and DI token accounts can be marked as Scratch Data and Scratch Token accounts when the account is first created. One difference between a regular DI account and a Scratch account is that the data availability for a Scratch account expires after a predetermined period of time, e.g., 2 weeks, which may be similar to the lifetime of transactions and signatures on the Signature chain. Once the data expires, the account is compressed, and a proof of the transactions is created. This proof contains less data than the Scratch account it represents, which allows the blockchain not to be burdened with moving substantial amounts of data over the main network.

To view the current state of data or token transactions in a Scratch account, a user may query the latest entry on the chain using the following commands.

Query (ace://di/account #data)
Query (acc://di/account #transaction)

A user can query the history of data or token transactions in a Scratch account over a period of time by specifying an arbitrary range:

Query (acc://di/account #data/0:10)
Query (acc://di/account #transaction/10:50)

As can be seen, in the above embodiment, the main parameter of Query is a URL, which includes generic labels of di and account that are specified by the user. The end of the URL is appended with the #data or #transaction fragment, which directs the search to the appropriate account type. The range (e.g., 0:10) provides a historical record of entries in sequential order. A query of 0:10 would retrieve records beginning with entry 0 and ending with entry 9. Any entry older than the predetermined period, e.g., 2 weeks, will be pruned, meaning that such entries will not be stored by the system.

Pruning is a data compression strategy designed to reduce the size of a data tree by removing unnecessary or redundant data. Pruning refers to the removal of intermediate and leaf (transaction) hashes once the outputs of the transactions, on which transactions those hashes rely, have been spent. Pruning significantly reduces the data footprint of the blockchain and allows a pruned node to fulfill many of the same functions as a full node. In the present invention, pruning may be applied to Signature chains and Scratch accounts, such that all transactions on a Signature chain and on a Scratch account are automatically pruned after a predetermined period, e.g., two weeks.

Unless an account is deliberately purged by a user, the SMT will still include the historical record of a Scratch account after its data is pruned. Transaction hashes and intermediate hashes are deleted, but the root hashes that summarize the state of a Scratch account would remain. This is illustrated in FIG. 7, where an SMT is being created from its transaction hashes. In a typical account, transaction hashes in the top row of an SMT are stored by the data servers to maintain a record of every entry. Root hashes that define the current state of the account are also stored by the data servers. In a Scratch account, transaction hashes are pruned, but the root hashes are saved on-chain. This allows any user with access to the transaction hashes, stored off-chain, to cryptographically prove the data in a Scratch account by deriving roots.

Scratch accounts allow a user or an organization to build arbitrarily complex use cases inexpensively without burdening the blockchain. The following list provides several applications for Scratch accounts.

Isolating events within high frequency data: Internet-of-Things ("IoT") networks can collect high-frequency data on Scratch accounts, prune baseline data, and promote important events (e.g., temperature fluctuations) to the Main chain. Baseline data can be periodically compressed to produce summary information about a system.

Deriving oracle data: Miners can scrape pricing information from public pricing feeds, mine the pricing data, and submit records of Scratch accounts for rewards at a fraction of the cost of writing data to the Main chain. The winning data is put on the Main chain while the losing data is pruned.

Proving transactions on exchange: It is cost-prohibitive for a major exchange to provide cryptographic proof of every transaction. With Scratch accounts, exchanges can store transaction data off-chain and cheaply derive root hashes prom pruned data.

Key Books and Key Pages

As explained above, the present invention implements account security and transaction authorization via Key Books and their respective Key Pages. Each account includes at least one key book applying to an account, such as a main (primary) Key Book, and may also include one or more secondary Key Books, e.g., Key Books of multiple managers, for additional layer(s) of authorization within a DI. For example, a manager might not approve a transaction making a token deposit into another account if the recipient account is not also managed by the same manager. All of the accounts in a DI can ultimately be secured by the DI's own key book account, which provides dynamic key management (keys may be replaced or added to corresponding key pages) of all the other accounts of the DI. For example, when a person stops being an authorizer of a company's transactions (e.g., an employee has been terminated), transaction authorization can be easily transferred to another individual or group by simply replacing the former authorizer's key in the corresponding key books with a new/replacement key(s).

Because each account belongs to a particular DI (i.e., each account is identity-based), and because each DI includes at least one Key Book, the primary Key Book used by an account may either be account specific, or it may be one of DI's Key Books. Thus, each transaction is associated with one Key Page of the origin account's main Key Book and may also be associated with Key Page(s) of a secondary-layer Key Book(s), e.g., one or more Manager Key Books. Each Key Page of a key book specifies the minimum number of signatures required from the list of one or more entries (keys) appearing on the Key Page. For a transaction to be authorized, it must meet the signature-threshold scheme (rules) in each of its associated Key Pages.

As disclosed above, a Key Page entry may be a hash of a signatory's public key and/or it may identify a Key Book authority, e.g., Manager Key Book within a DI (supplemental key book) or an address (e.g., URL) of a Key Book from an external DI (external key book). For example, FIG. 4 shows Key Page 408 listing four different entries (keys) in the form of public key hashes and specifying a four-signature threshold. In comparison, FIG. 5 shows Key Page 502 specifying a three-signature threshold and having three entries (keys), two of which (references 504 and 506) point to two different key book authorities ("Key Book B" reference 518, and "Key Book C" reference 522). These key books could be from the same DI as the account's DI (i.e., internal DI) or they could be from an external DI. The third entry 508 is a key corresponding to a public key of the transaction's originator. As a result, the present invention enables transaction approval by account authorizers from within a DI and/or from external DIs. Importantly, when transaction approval from within a DI is performed via a manager key book, the manager key book could be identified at an account level and/or it could be identified, as a supplemental key book, via a key-page of another key book that applies to the account.

When using multiple Key Book authorities, each authority's Key Book can include Key Pages with varying signature-authorization schemes (rules). Moreover, different authorities may serve the same or different functions. For example, if an account uses two separate manager Key Books, each manager Key Book may analyze the transaction for the same function/characteristic (e.g., two individuals or separate groups within a company provide independent authorizations based on the amount of the transaction) or they may analyze the transaction for different functions/characteristics (e.g., one manager Key Book may provide an authorization based on the amount of the transaction and the other manager Key Book may provide an authorization based on anti-money laundering criteria). The latter scenario may be referred to as stacked manager authorizations or stacked manager Key Books.

Key Book authorities from one or more external DIs may be used in a similar manner. For example, one Key Book from an external DI (external entity) may involve an authorization based on anti-money laundering criteria, while the other Key Book from the same or different external DI may involve an authorization based on the identities of the transacting parties, e.g., whether one or both qualify as an accredited investor.

Because each Key Book authority may define its own rules for authorizing/validating transactions, each authority can refuse to authorize transactions that do not follow its specific rules. Moreover, a transaction submitted for authorization to Key Book authorities may have additional side effects, such as triggering other transactions initiated by a Key Book authority, e.g., manager.

In addition, because the present invention enables Key Book authorizations/verifications from external entities (e.g., FIG. 5, "Key Book B," reference 518), those external entities may implement all kinds of complicated rules off-chain without burdening the blockchain account in question. This allows for off-chain validation of smart contracts while limiting their computational costs for the invented system. For example, an external entity may comprise an external validator network that validates smart contracts, e.g., token transactions, using its own set of rules electronically, thus providing fully electronic validation. In another example, an external entity may implement a set of rules requiring several members of that entity to review the transaction individually and to sign off on the transaction in writing. In yet another scenario, the external entity may require its members to have a group meeting, after which a signature by one particular individual would be sufficient to validate the transaction. In all of the above situations, the originator account in question can be considered a managed account or managed chain. The invention in not limited to the examples of external validation of smart contracts provided above, and many other possible embodiments of off-chain validation of smart contracts are within the scope of the invention.

The embodiments described with respect to FIGS. 4, 5, 6, and 8 provide examples of processes and systems in which transactions, such as multi-signature transactions, are first placed on an account's signature (secondary) chain and are then moved to the account's main (primary) chain upon having been authorized/validated/signed by a sufficient number of transaction authorizers/validators. Specifically, in the above-described embodiments, a transaction originator signs/authorizes a multi-signature (or managed) transaction, places/records it on his/her account's signature (secondary) chain and informs the validator(s)/transaction authorizer(s) that the transaction is waiting for them to be authorized/validated. (If an account includes one or more Manager Key Books, the system may also automatically inform the manager(s).) As each authorizer/validator from a corresponding key page signs the transaction, the system records the authorization on the signature (secondary) chain. Based on the signature threshold value from the corresponding Key Page, once a sufficient number of authorizers/validators have approved/authorized/signed the transaction, the system records the transaction to the account's main (primary) chain.

In an alternative embodiment, however, the originator may sign the transaction without placing it on his/her account's signature chain. Instead, the originator sends the transaction to an authorizer (validator) via some communication channel, e.g., e-mail. Upon receipt, if the transaction meets the authorizer's (validator's) evaluation criteria, the authorizer signs the transaction and submits it to the originator's main chain. (Note, a copy of the authorizer's signature may still be placed on the originator's signature chain.)

The present invention also contemplates an embodiment in which a manager or another authorized party may submit transactions onto a managed account's main chain (or the managed account's signature chain) that the account's user did not initiate/authorize. For example, because the manager may control token issuance, the manager could increase or decrease the token balance in an account. Automatic payments transactions, e.g., automatic monthly utility-bill payments, constitute another example where a manager or an external entity may submit transactions onto a managed account's main chain (or the managed account's signature chain) that the account's user (owner or holder) did not initiate. This way, once a party has been designated as an authority for submitting transactions on the account user's main chain (or signature chain), via a manager key book or an external key book, the account can be managed without the account user's further input.

Anchoring

Anchoring is the process of inserting external data into a blockchain transaction to provide an immutable receipt that can be verified by anyone with access to the original data. This is typically accomplished by hashing the data on or off-chain, constructing a Merkle tree from that data, and periodically inserting its Merkle root into a larger and secure blockchain, e.g., Bitcoin or Ethereum. By hashing a transaction into larger directory blocks and combining directory blocks into larger anchors, one is thus able to maintain an immutable record of thousands of hashes at the cost of a single transaction. Because the present invention uses a chain-of-chains architecture, it requires internal anchors, where accounts are connected by anchoring their roots to their respective BVNs, BVNs are connected by anchoring their roots to the DN, and blocks are connected by anchoring the root of the DN into each BVN.

Figure 9:
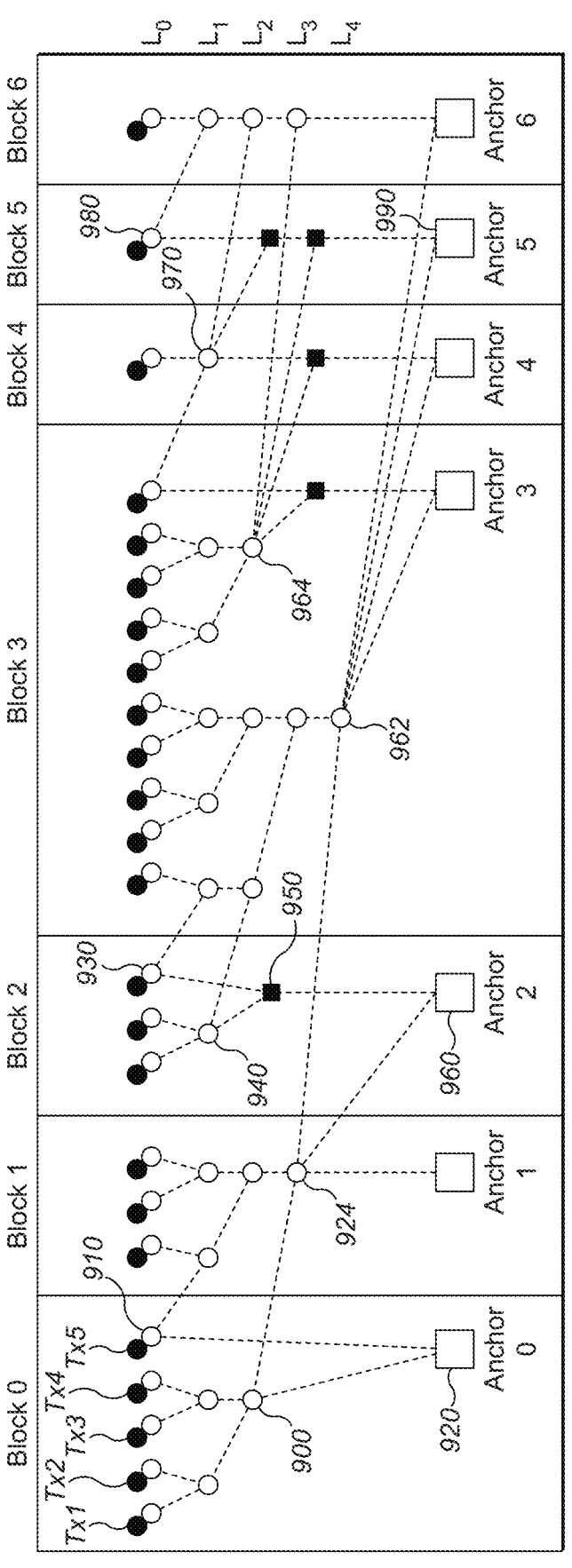
FIG. 9 shows a method of anchoring transactions according to an embodiment of the present invention.

In the invented system, the end of a block is treated as a synchronization point that designates when transactions should be anchored, and every chain can be modeled as a continuously growing SMT. However, the freedom to append new hashes on a continuous basis may result in the SMT having multiple roots at any point in time. Because anchoring requires a single root, the present invention organizes the hashes from any account chain (e.g., Main chain) or system chain (e.g., Synthetic Transaction chain) that changed since the previous block into roots at the end of the current block. Multiple roots are combined into a single root (i.e., anchor). This process is illustrated in FIG. 9 for a generic account chain where black dots represent raw transactions, circles represent hashes, large squares represent final anchors, and smaller black squares represent intermediate anchors. (Note, although in the figure the blocks are shown as having different durations, all six blocks in the figure have the same duration—the amount of transaction traffic was different during each block period.) The hashes are illustrated as being located at five different levels. $L_0$ through $L_4$ from top to bottom, with $L_0$ referring to the top row (i.e., leaf) hashes of raw transactions.

At the end of every block, hashes are combined into roots. For example, in Block 0 one root (reference 900) is produced on level L2 from transactions Tx1 through Tx4, and a second root (reference 910) is produced from transaction Tx5 on level $L_0$. These two roots are concatenated and hashed (combined) to produce a root anchor "Anchor 0" (reference 920) for Block 0.

If the root of a previous block is on a higher level (level number) than the root of the current block, then these roots must be connected through intermediate anchor(s) before a final anchor root is produced. For example, Block 2 introduces two new root hashes, root 930 at level $L_0$ and root 940 at level $L_1$. These are concatenated and hashed to produce an intermediate anchor 950 at level $L_2$. This intermediate anchor is concatenated with root 924 on level La in Block 1, and then hashed to produce a root anchor "Anchor 2" (reference 960). This anchor summarizes the entire history of the account chain until this point in time because it includes every hash from Block 0 through Block 2. The number of intermediate anchors required to produce a final anchor that summarizes the history of the chain until that point is equal to two less than the number of roots in the SMT. (Intermediate anchors are required only if the SMT has more than two roots.)

For example, Block 5 introduces a single new root 980 at level $L_0$. Block 4 has a single root 970 at level $L_1$. Block 3 has two roots (962 and 964). Therefore, Block 5 needs two intermediate anchors to produce root anchor "Anchor 5" (reference 990), which can also be referred to as a final anchor for this block.

Every chain in a BVN, except for the BPT, appends its hashes to an SMT whose anchor represents the current history of the chain. Every account, with the exception of the Root Anchor chain, inserts its account proof as a key-value pair into the BPT, where the anchor of the BPT represents the current state of the entire BVN. These anchors are then fed into the Root Anchor chain, whose root anchor represents both the history and state of every chain within a particular BVN. This process occurs in parallel within every BVN in the network and also within the DN, which contains its own BPT, Synthetic Transaction Chain, and a Main chain and Signature chain for the ACME token issuer.

The process of collecting hashes, producing roots, and anchoring roots into other chains can be modeled as a fractal. This can be gleaned from FIG. 2 for the DN, an arbitrary number of BVNs, and an arbitrary number of account chains within a BVN.

The multi-chain architecture and cross-chain capabilities of the invention expand the utility of anchoring through its use of internal and external anchors. Internal anchors may be used for cryptographic timestamping within the network. External anchors can be exchanged with any blockchain platform that produces a summary hash, allowing the invented system to act as a universal bridge between the blockchain and the real world. This bridge enables a variety of applications, some of which are listed below.

Tamper-proof records: The system can regularly anchor its DN root hash into layer-1 blockchain transactions, such as Bitcoin transactions, to create timestamped receipts. Any customer with access to the original data can derive the anchor and cryptographically prove validity of the receipt.

Proof of existence: Internal anchors are compact historical records that can be used to prove the existence and order of transactions at the frequency of a minor block (block providing highest resolution for SMT synchronization). The valuation of a piece of real estate at a given point in time, the purchase of an insurance policy before a claim is submitted, and the use of a license before a contract expires can all be managed by the invented system.

Cross-chain bridges: Anchoring allows the system to extend its Merkle proof into another blockchain. For example, data from a blockchain on another platform, such as Tezos, can be validated through an Ethereum smart contract using the invented system as a bridge.

Synthetic Transactions

The invented system resolves the scalability trilemma by being organized around digital identities (e.g., DIs, Lite accounts) and treating each account as an independent blockchain. All accounts and the data contained within can be operated upon independently and validated by a series of BVNs that operate in parallel. Each BVN is a network of Tendermint nodes that is responsible for validating transactions initiated by an account. Each account is assigned to a particular BVN, and as more identities are created, more BVNs can be added to scale the network and maintain high throughput. The summary hashes of an account's current state are anchored to the BVN. In the meantime, each BVN is anchored to the DN, which is responsible for coordinating the BVNs and guaranteeing security for the network. Security is further enhanced by anchoring the DN to a secondary blockchain, such as Ethereum or Bitcoin to gain the added security provided by those networks.

While each identity acts as its own independent blockchain, transactions between the BVNs that host those identities necessitate a query of the sender's transaction history to determine if the sender actually possesses the assets they wish to send. Since no single BVN contains the entire state of the network, each BVN must be queried independently. As more BVNs are added to scale the network, the majority of queries will involve BVNs that have no transaction history with the sender, putting unnecessary load on each BVN.

To optimize transaction throughput, the invention uses synthetic transactions, which can broadly be defined as any transaction that is produced by the system rather than the user. The following is an example explaining the need for synthetic transactions.

We start with separate entities Alice, Bob, and Charlie on the invented system. Assume that Alice's transactions are handled by BVN1, Bob's by BVN2, and Charlie's by BVN3. Assume that Bob needs to pay Charlie but can only do so once Alice pays him back. Alice sends a transaction to Bob after BVN1 verifies that Alice has sufficient funds. Bob receives the tokens from Alice and sends a transaction to Charlie through BVN2. Because Alice sent her transaction through BVN1, however, BVN2 does not know about Alice's transaction or from which BVN it came. Therefore, BVN2 will have to query all other BVNs to verify that Bob has enough money to pay Charlie. Creating transaction flows with synthetic transactions resolves this problem.

After BVN1 has validated Alice's transaction, it sends a second transaction, called a synthetic transaction, to BVN2 that says, "Deposit X tokens into Bob's account." Now both BVNs have a complete record of everything that has happened to their respective chains, and future transactions involving these chains will not require either BVN to query other BVNs in the system. To ensure that no fake synthetic transaction can be injected into the system by an external player, the DN is used to produce cryptographic receipts for validating synthetic transactions. Thus, only valid synthetic transactions produced by the validators on a BVN can be processed and validated.

Figure 10:
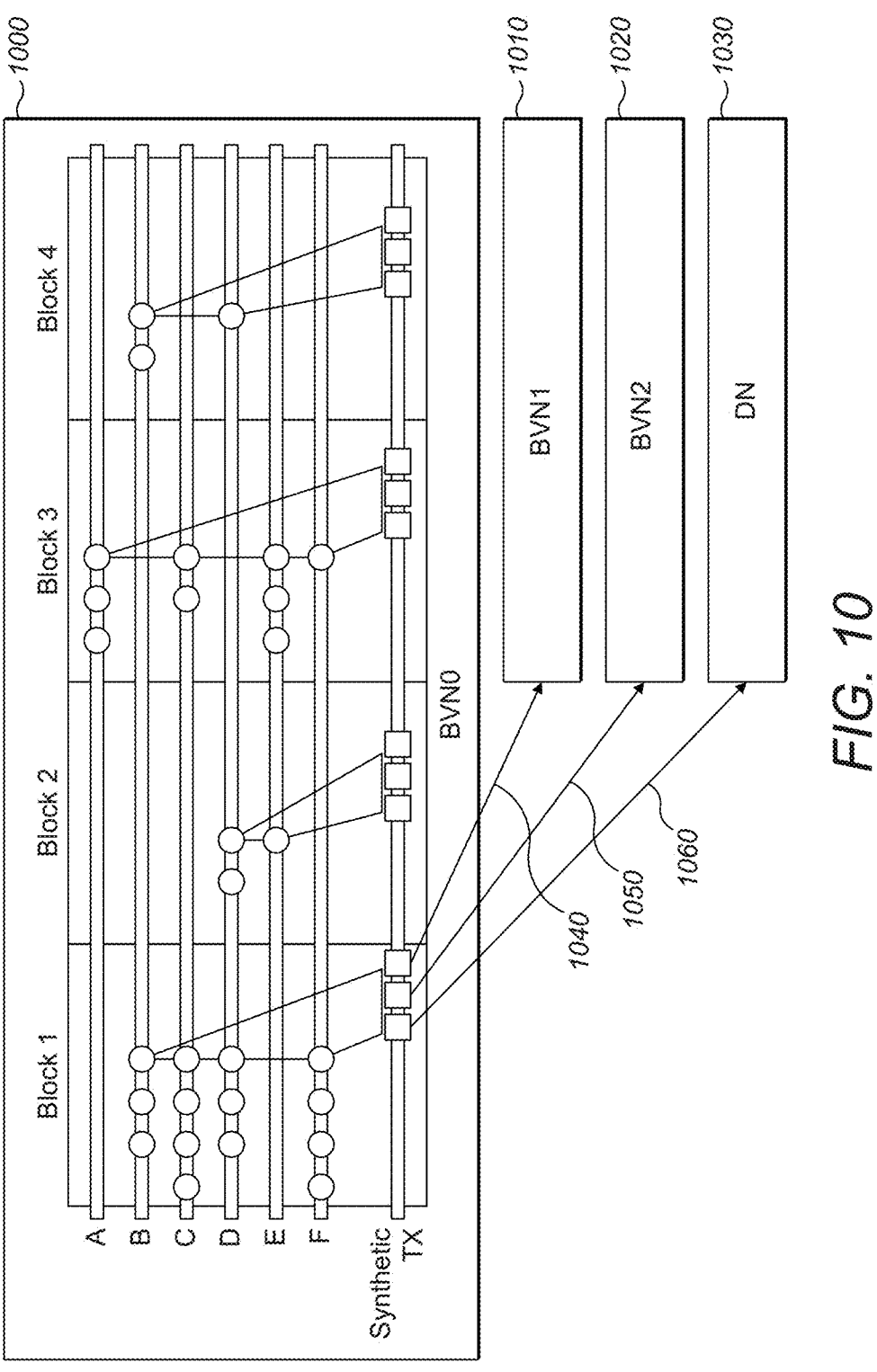
FIG. 10 shows a method of producing synthetic transactions according to an embodiment of the present invention.

FIG. 10 conceptually shows individual synthetic transactions originating from BVN0 identities A through F (in rows A through F) and updating accounts of identities handled by other BVNs. Such transactions are being collected in each blockchain block and sent as a bulk synthetic transaction from BVN0 (reference 1000) to BVN1 (reference 1010), BVN2 (reference 1020) and the DN (reference 1030). The circles in rows A through F represent transactions, while the squares in the row labeled "Synthetic TX" represent sets of transactions between identities A through F and identities handled by other BVNs. Arrows 1040, 1050 and 1060 from BVN0 (reference 1000) to BVN1 (reference 1010), BVN2 (reference 1020), and the DN (reference 1030), respectively, represent communication between all DIs hosted by BVN0 and all DIs hosted on other BVNs or the DN. BVN1, for example, may contain identities G though J. (For clarity, FIG. 10 shows communication from BVN0 to BVN1, BVN2, and the DN in block 1 only.)

When a transaction or a set of transactions validates on the invented network, if those transactions need to update accounts in other Root Identities handled by other BVNs, the system produces synthetic transactions that essentially export those updates to other BVNs. Those updates do not require state in BVN0 to validate what they should do in BVN1, BVN2, or the DN. If BVN0 is sending a transaction to BVN1 and later to BVN2, BVN0 may operate at full speed and interact with BVN2 without having to wait on BVN1 to accept the deposit.

Figure 11A:
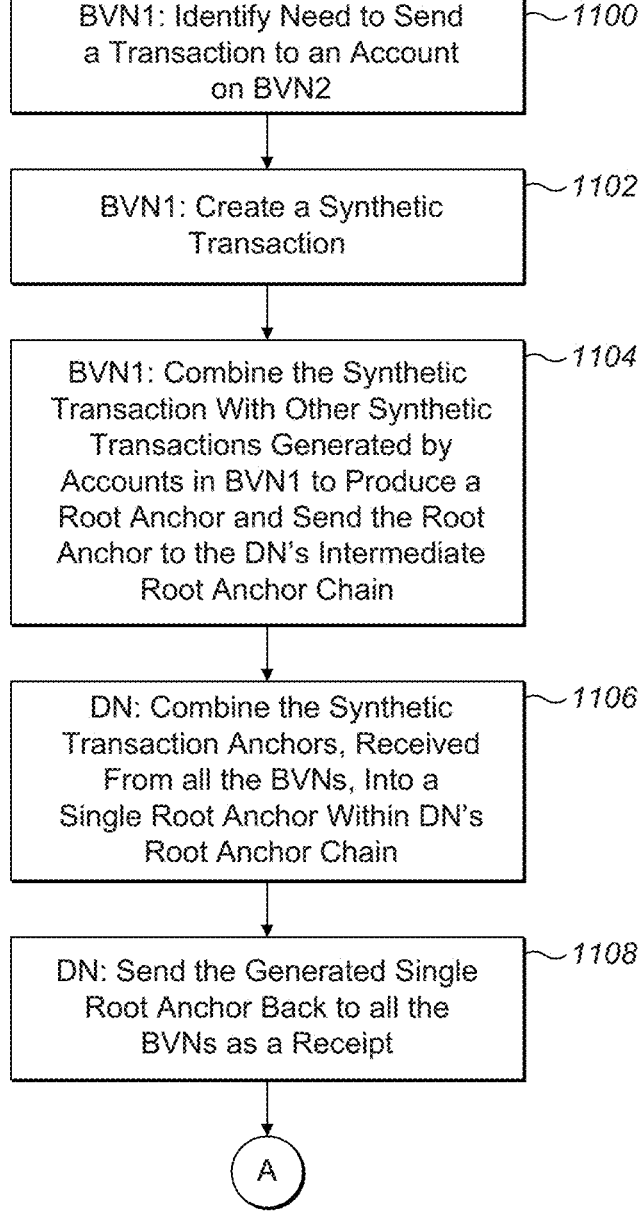
FIGS. 11A and 11B show a method of processing synthetic transactions according to one embodiment of the invention.
Figure 11B:
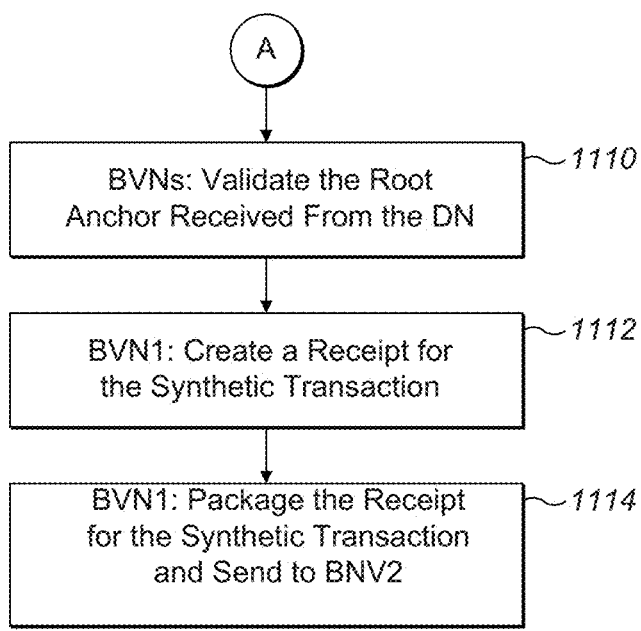

FIGS. 11A and 11B show a method of processing synthetic transactions according to one embodiment of the invention. At Step 1100 an account on BVN1 identifies the need to send a transaction to an account on BVN2, which at step 1102 results in BVN1 creating a synthetic transaction. For BVN$_2$ to trust the synthetic transaction, it must be able to prove that the synthetic transaction was included in a completed DN block. Therefore, the method proceeds to Step 1104, in which the synthetic transaction is combined with other synthetic transactions generated by accounts in BVN1 during that block to produce a root anchor that is included in BVN1's Root Anchor Chain and sent to the DN's Intermediate Anchor chain. At Step 1106, the DN's Intermediate Anchor chain collects synthetic transaction anchors from all the BVNs (via the Root Anchor Chains of those BVNs) and combines them into a single anchor within the DN's Root Anchor chain. This anchor is sent back to all the BVNs as a receipt (Step 1108). In Step 1110, BVN1 (along with all other BVNs) validates the root anchor, and in Step 1112 it creates a receipt for the synthetic transaction, starting with the hash of the synthetic transaction and ending with an anchor from the DN's Root Anchor chain. In Step 1114, BVN1 packages up the receipt and sends this as a synthetic transaction to BVN2. Because BVN2 has also validated this block of the DN, a simple Merkle proof is all that is needed for the BVN2 to prove this synthetic transaction. Accordingly, the process reduces the number of queries from N*(N−1) to 2N, with N being the number of BVNs, which allows the network to scale linearly as more BVNs are added.

Major and Minor Blocks

In prior art blockchains, all transactions submitted by all accounts within a block were combined into a root hash inside a single, traditional Merkle tree. A new Merkle tree was generated in the subsequent block and tied to the state of the previous block by including the previous root hash in the subsequent block's header. Synchronization between nodes on prior art blockchain networks was handled on a per-block basis, which meant that transactions could not process until a new block is created. This typically occurred on the scale of minutes for Proof of Work ("PoW") blockchains like Bitcoin, and seconds for Proof-of-Stake blockchains like Algorand and Ethereum 2.0.

Because the invented blockchain system is organized around accounts that define blocks using a single growing SMT, each account is thus a continuously growing SMT with arbitrary block times that can be validated at multiple synchronization points to coordinate consensus between BVNs. For example, in one embodiment of the invention, the system could use two different synchronization periods. (e.g., 1-second period and 12-hour period), each defining a different group of blockchain blocks. As used hereafter, blocks with a 1-second period are referred to as minor blocks, and blocks with a 12-hour period are referred to as major blocks. Shorter block times are constrained by the speed at which the node consensus layer can validate transactions. Longer block times require less state and allow mobile devices to work as lite nodes that can validate a subset of transactions relevant to an account owner.

Minor blocks may be used to establish which set of accounts within a particular BVN changed within the last second and major blocks may be used to establish which set of accounts within a particular BVN changed within the last 12 hours. Moreover, major blocks could use minor blocks to make such determinations. In other words, 1-second blocks over a 12-hour period could be rewritten as a single 12-hour block. Changes to the Main and Signature chains of each account and to the Synthetic Transaction chain of a BVN can be recorded as root hashes that are anchored into the Minor Root Anchor chain and Major Root Anchor chain of that particular BVN.

Figure 12A:
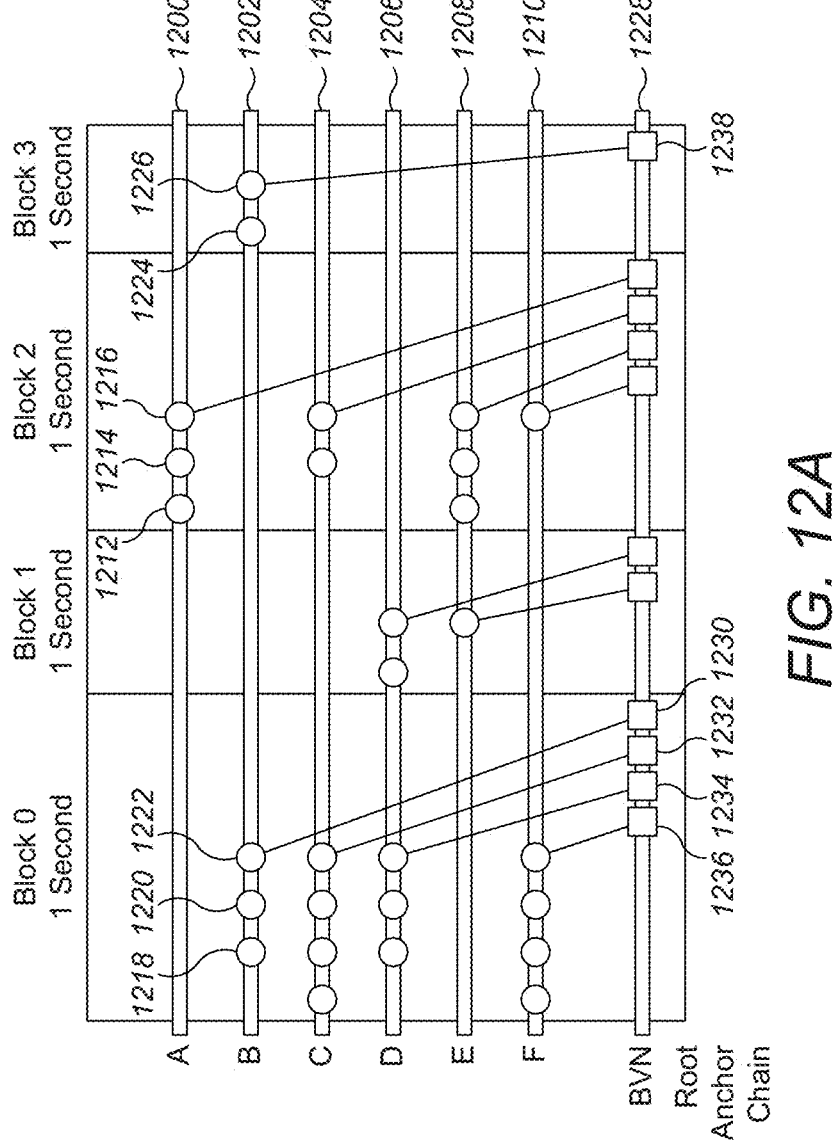
FIG. 12A shows a process of using minor blocks to form a minor anchor chain according to an embodiment of the invention.
Figure 12B:
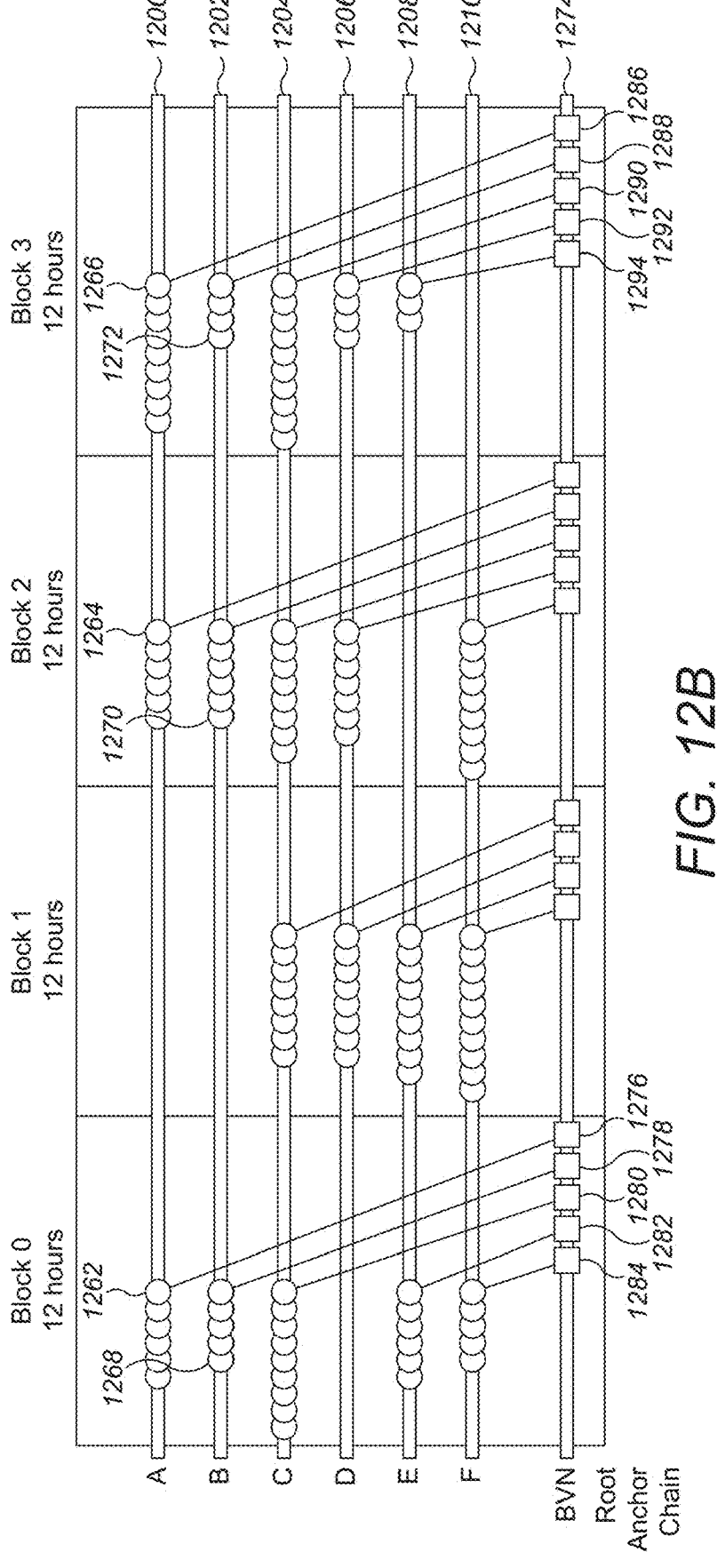
FIG. 12B shows a process of using major blocks to form a major anchor chain according to an embodiment of the invention.

FIG. 12A illustrates this process for hypothetical accounts A-F across several minor blocks on a single BVN, and FIG. 12B illustrates this process for the hypothetical accounts A-F across several major blocks of the BVN. In both figures, circles represent transaction hashes submitted by accounts A-F in different consecutive minor or major blocks, respectively. These transaction hashes are combined in the SMT of each account at each block and an anchor root hash is derived and placed in the corresponding root anchor chain. The order in which each anchor is added to the respective anchor chain may be determined by the account ID, which, in one embodiment, is derived by hashing the entire account URL and collecting a predetermined set of bits (e.g., first 8 bytes) of the hash.

FIG. 12A shows blockchains 1200, 1202, 1204, 1206, 1208, and 1210 for accounts A though F, respectively, with transaction hashes added to each account chain across four blocks of 1-second duration each. For example, FIG. 12A illustrates a situation in which no transactions occur in account A during Block 0, Block 1, and Block 3, and three transactions occur during Block 2, due to which three transaction-hash entries (1212, 1214, and 1216) are added to the blockchain 1200 of account A during the minor Block 2. FIG. 12A also indicates that three transactions occur in account B during minor Block 0 and two transactions occur in account B during minor Block 3, with no transactions occurring in account B during minor Blocks 1 and 2. The three transactions occurring in account B during the minor Block 0 result in transaction-hash entries 1218, 1220, and 1222 being added to the blockchain 1202 of account B during the minor Block 0. The two transactions in account B during the minor Block 3 result in transaction-hash entries 1224 and 1226 being added to the blockchain 1202 during the minor Block 3. FIG. 12A also conceptually illustrates that during each minor block, the system determines an SMT anchor hash for each account that has changed during the block period (i.e., transactions have been applied to the account) and anchors it into the minor Root Anchor chain 1228 of a particular BVN. For example, FIG. 12A conceptually shows root anchors from account chains B (reference 1202), C (reference 1204), D (reference 1206), and F (reference 1210), respectively, being anchored into the minor Root Anchor chain 1228 of the BVN for minor Block 0. Yet, for minor Block 3, only the root anchor from account chain B (reference 1202) is anchored into the minor Root Anchor chain 1228. This results in the anchor entries 1230, 1232, 1234, and 1236 being added to the minor Root Anchor chain 1228 of the BVN in minor Block 0, and in the anchor entry 1238 being added to the minor Root Anchor chain 1228 of the BVN in minor Block 3. Each anchor entry includes the anchor of its respective account-chain (A-F) at the end of that minor block.

In addition, in one embodiment, each anchor entry in the minor Root Anchor chain 1228 also includes an index of the first entry (transaction-hash) within the respective account-chain and the number of entries (transaction-hashes) in the block for that account-chain. For example, anchor entry 1230 holds the anchor hash of the blockchain of account B (reference 1202), the index of the first transaction-hash entry 1218 in the blockchain 1202, and a length of three (the number of transaction-hashes in the blockchain 1202 during the minor Block 0). The rest of the illustrated anchor entries in the minor Root Anchor chain 1228 are formed in a similar way. Those of ordinary skill in the art will readily appreciate that there are many alternative ways to implement an index, potentially involving alternative data structures and alternative storage locations (i.e., not on the Root Anchor chain).

FIG. 12B shows blockchains 1200, 1202, 1204, 1206, 1208, and 1210 for accounts A though F, respectively, with transaction hashes added to each respective account chain across four blocks of 12-hour duration each, i.e., major blocks. For example, FIG. 12B illustrates a situation in which multiple transactions occur in account A during major Blocks 0, 2, and 3 but not during major Block 1. Reference 1262 collectively represents the transaction-hash entries of the respective transactions occurring in account A during the major Block 0; reference 1264 collectively represents the transaction-hash entries of the respective transactions occurring in account A during major Block 2; and reference 1266 collectively represents the transaction-hash entries of the respective transactions occurring in account A during major Block 3. The transaction-hash entry groups 1262, 1264, and 1266 are added to the blockchain 1200 of account A during the major Blocks 0, 2, and 3, respectively. FIG. 12B also indicates that multiple transactions occur in account B during major Blocks 0, 2 and 3, with no transactions occurring in account B during the major Block 1. The transactions occurring in account B during major Block 0 result in the respective transaction-hash entries (collectively represented by reference 1268) being added to the blockchain 1202 of account B during major Block 0; transactions occurring in account B during major Block 2 result in the respective transaction-hash entries (collectively represented by reference 1270) being added to the blockchain 1202 of account B during major Block 2; and transactions occurring in account B during major Block 3 result in the respective transaction-hash entries (collectively represented by reference 1272) being added to the blockchain 1202 of account B during major Block 3.

FIG. 12B also conceptually illustrates that during each major block, the system determines an SMT anchor hash for each account with transactions during that block and anchors it into the major Root Anchor chain 1274 of a particular BVN for that block. For example, FIG. 12B conceptually shows that for major Block 0, only root anchors of account chains A (reference 1200), B (reference 1202), C (reference 1204), E (reference 1208), and F (reference 1210), respectively, are anchored into the major Root Anchor chain 1274 of the BVN. Yet, for major Block 3, only root anchors of account chains A (reference 1200), B (reference 1202), C (reference 1204), D (reference 1206) and E (reference 1208) are anchored into the major Root Anchor chain 1274. This results in the anchor entries 1276, 1278, 1280, 1282, and 1284 being added to the major Root Anchor chain 1274 of the BVN for major Block 0, and in anchor entries 1286, 1288, 1290, 1292, and 1294 being added to the major Root Anchor chain 1274 of the BVN for major Block 3. Each anchor entry includes the anchor of its respective account-chain (A-F) in that major block.

In addition, in one embodiment, each anchor entry in the major Root Anchor chain 1274 also includes an index of the first entry (transaction-hash) within the respective account-chain (blockchain of an account) and the number of entries (transaction-hashes) in the major block for that account-chain. For example, anchor entry 1276 holds the anchor hash of the blockchain of account A (reference 1200), the index of the first transaction-hash entry in the blockchain 1200 during the major Block 0, and length (the number of transaction-hashes in the blockchain 1200 during the major Block 0). The rest of the illustrated anchor entries in the major Root Anchor chain 1274 are formed in a similar way. Those of ordinary skill in the art will readily appreciate that there are many alternative ways to implement an index, potentially involving alternative data structures and alternative storage locations (i.e., not on the Root Anchor chain).

Because each account is treated as an independent blockchain, there is no single spatial block that represents the entire network. Similarly, transactions submitted by an account are processed by one of many BVNs in the network that coordinate consensus but otherwise can operate independently. This allows for having multiple block times of arbitrary length without disrupting the network. Those of ordinary skill in the art will readily recognize that in one embodiment the duration of minor blocks may be different between the BVNs and the DN or between different BVNs. For example, a major block of the DN may include 2 major blocks of BVNn. The same is true for minor blocks.

The use of multiple block times allows the network to quickly process transactions at speeds comparable to the fastest Proof-of-Stake systems, while giving users the ability to store the entire state of the network on devices with reduced memory capacity (such as mobile devices). Indexing of the blocks on multiple time scales (e.g., two time-scales) reduces the storage space requirement by reducing the granularity of indexing for past transactions. For example, to save memory space, entries on the minor root anchor chains or on scratch chains (e.g., Signature chains) may be discarded after a predetermined period of time (e.g., 2 weeks). As a result, the granularity of data can be reduced to 12 hours after that point in time.

Figure 13:
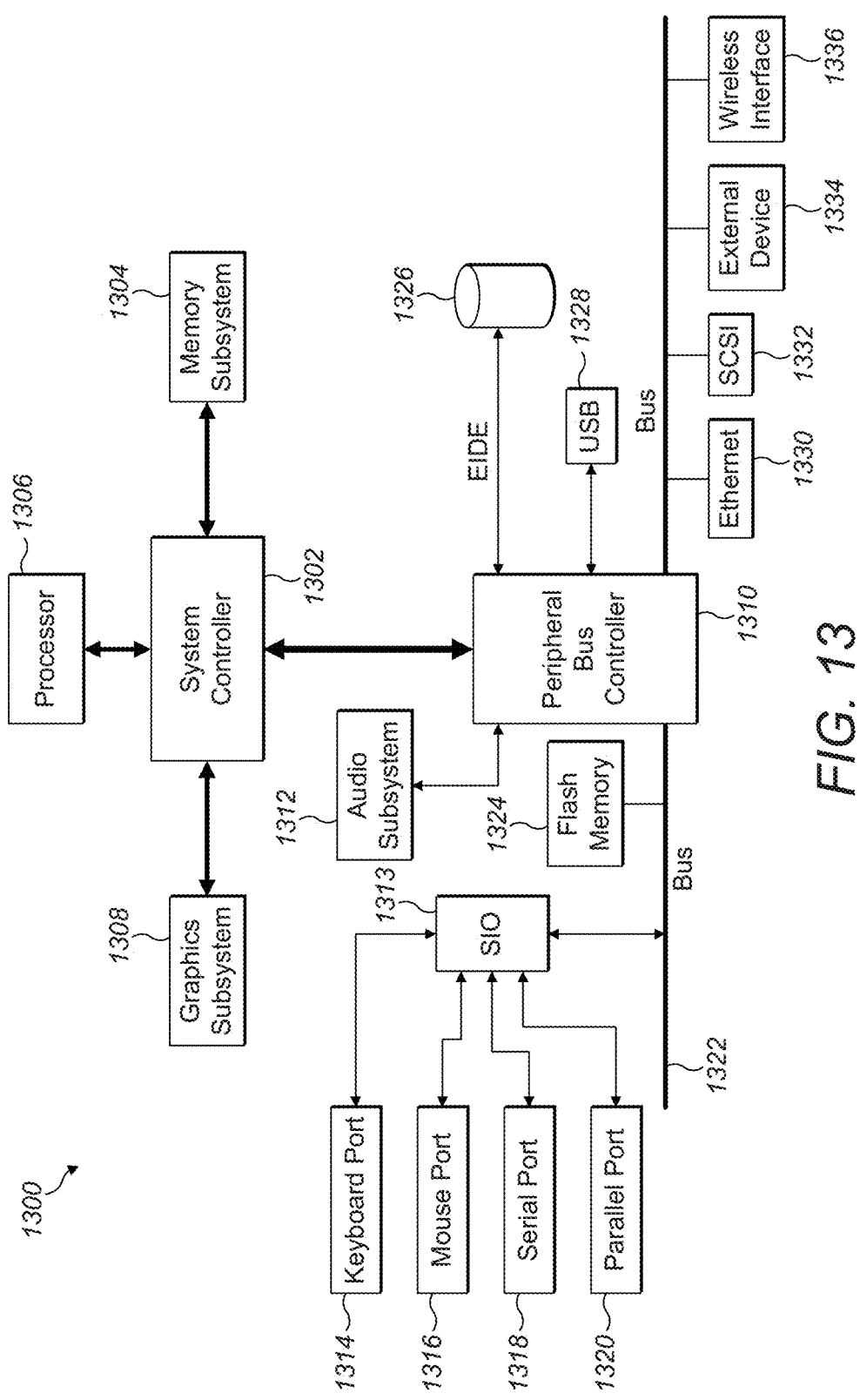
FIG. 13 shows an embodiment of a server that can operate as a node in the invented system.

FIG. 13 shows an embodiment of a server that can operate as a node in the invented system. The server 1300 includes a system controller 1302 that is coupled to a memory subsystem 1304, a processor 1306, a graphics subsystem 1308 and a peripheral bus controller 1310. The peripheral bus controller 1310 may be coupled to some elements directly and to other elements via a communication bus 1322. For example, the peripheral bus controller may be coupled directly to a storage 1326 via an enhanced integrated drive electronics (EIDE) interface, to a USB interface port 1328, and to an audio subsystem 1312. At the same time, the bus 1322 may couple the peripheral bus controller 1310 to a super input/output (SIO) circuit 1313, flash memory 1324, Ethernet port 1330, a small computer system interface (SCSI) 1332, an external device 1334, and a wireless interface 1336, such as Wifi, Bluetooth, cellular, etc. The SIO circuit 1313, in turn, may be coupled to a keyboard port 1314, a mouse port 1316, a serial interface port 1318, and a parallel interface port 1320.

Exemplary embodiments may be applied to any processor-controlled device operating in the wired or radio-frequency domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations," this could include the processor performing the operations directly and/or facilitating, directing, or cooperating with another device or component to perform the operations.

Exemplary embodiments may packetize. The servers may have network interfaces to the various communications networks, thus allowing transmittal and retrieval of information. The information may be received as packets of data according to a packet protocol (such as the Internet Protocol). The packets of data contain bits or bytes of data describing the contents, or payload, of a message. A header of each packet of data may contain routing information identifying an origination address and/or a destination address.

While the foregoing descriptions disclose specific values, any other values may be used to achieve similar results. Furthermore, the various features of the foregoing embodiments may be selected and combined to produce numerous variations of improved systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded as illustrative rather than restrictive, and all such modifications are intended to be included within the scope of present teachings.

Moreover, in this document, relational terms such as first and second, top and bottom, and the like may be used solely to distinguish one entity or action from another entity or action without necessarily requiring or implying any such specific relationship or order between such entities or actions. The terms "comprises," "comprising." "has", "having." "includes", "including," "contains", "containing" or any other variation thereof, are intended to cover a non-exclusive implementation, such that a process, method, article, or apparatus that comprises, has, includes, contains a list of elements does not include only those elements but may include other elements not expressly listed or inherent to such process, method, article, or apparatus. An element preceded by "comprises . . . a". "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data management method in a blockchain system having an identity-based blockchain account including a primary chain, a secondary chain, and at least one key book applying to the identity-based blockchain account, the at least one key book having a key page, the method comprising:

a) associating a multi-signature transaction with the key page of the at least one key book, the key page comprising (i) a signature-authorization rule, and (ii) a plurality of keys corresponding to a plurality of transaction authorizers, wherein each key of the plurality of keys of the key page of the at least one key book comprises one of (i) a hash of a transaction authorizer's public key, and (ii) a designation of a key-book authority;

b) recording, in the secondary chain, an authorization of the multi-signature transaction from a transaction authorizer of the plurality of transaction authorizers; and c) once a number of authorizations recorded on the secondary chain satisfies the signature-authorization rule, recording the multi-signature transaction on the primary chain for execution, wherein the identity-based blockchain account belongs to a first digital identity, and wherein the designation of a key-book authority identifies one of (i) a supplemental key book belonging to the first digital identity, and (ii) an external key book belonging to a second digital identity.

2. The data management method of claim 1, wherein the supplemental key book belonging to the first digital identity comprises a first manager key book for authorizing the multi-signature transaction based on a first characteristic of the multi-signature transaction and a second manager key book for authorizing the multi-signature transaction based on a second characteristic of the multi-signature transaction.

3. The data management method of claim 1, wherein the external key book belonging to a second digital identity is identified via a uniform resource locator (URL) address.

4. The data management method of claim 1, wherein the external key book belonging to a second digital identity authorizes the multi-signature transaction based on a set of rules of the second digital identity, thereby enabling an off-chain validation of a smart contract.

5. The data management method of claim 1, wherein the at least one key book comprises a primary-layer key book and a secondary-layer key book, and wherein the secondary-layer key book enhances security of the identity-based blockchain account.

6. The data management method of claim 1, wherein the key page is configured to allow replacement of at least one key of the plurality of keys, thereby enabling a dynamic key management.

7. A blockchain system having an identity-based blockchain account including a primary chain, a secondary chain, and at least one key book applying to the identity-based blockchain account, the at least one key book having a key page, the system comprising:

a hardware processor; and a memory device storing instructions that, when executed by the hardware processor, cause the processor to:

a) associate a multi-signature transaction with the key page of the at least one key book, the key page comprising (i) a signature-authorization rule, and (ii) a plurality of keys corresponding to a plurality of transaction authorizers, wherein each key of the plurality of keys of the key page of the at least one key book comprises one of (i) a hash of a transaction authorizer's public key, and (ii) a designation of a key-book authority;

b) record, in the secondary chain, an authorization of the multi-signature transaction from a transaction authorizer of the plurality of transaction authorizers; and c) once a number of authorizations recorded on the secondary chain satisfies the signature-authorization rule, record the multi-signature transaction on the primary chain for execution;

wherein the identity-based blockchain account belongs to a first digital identity, and wherein the designation of a key-book authority identifies one of (i) a supplemental key book belonging to the first digital identity, and (ii) an external key book belonging to a second digital identity.

8. The blockchain system of claim 7, wherein the supplemental key book belonging to the first digital identity comprises a first manager key book for authorizing the multi-signature transaction based on a first characteristic of the multi-signature transaction and a second manager key book for authorizing the multi-signature transaction based on a second characteristic of the multi-signature transaction.

9. The blockchain system of claim 7, wherein the external key book belonging to a second digital identity is identified via a uniform resource locator (URL) address.

10. The blockchain system of claim 7, wherein the external key book belonging to a second digital identity authorizes the multi-signature transaction based on a set of rules of the second digital identity, thereby enabling an off-chain validation of a smart contract.

11. The blockchain system of claim 7, wherein the at least one key book comprises a primary-layer key book and a secondary-layer key book, and wherein the secondary-layer key book enhances security of the identity-based blockchain account.

12. The blockchain system of claim 7, wherein the key page is configured to allow replacement of at least one key of the plurality of keys, thereby enabling a dynamic key management.

13. A memory device storing instructions that, when executed by a hardware processor, cause the hardware processor to:

a) associate multi-signature transaction with a key page of at least one key book applying to the identity-based blockchain account, the key page comprising (i) a signature-authorization rule, and (ii) a plurality of keys corresponding to a plurality of transaction authorizers, wherein each key of the plurality of keys of the key page of the at least one key book comprises one of (i) a hash of a transaction authorizer's public key, and (ii) a designation of a key-book authority;

b) record, in the secondary chain, an authorization of the multi-signature transaction from a transaction-authorizer of the plurality of transaction-authorizers; and c) once a number of authorizations recorded on the secondary chain satisfies the signature-authorization rule, record the multi-signature transaction on a primary chain of the identity-based blockchain account for execution;

wherein the identity-based blockchain account belongs to a first digital identity, and wherein the designation of a key-book authority identifies one of (i) a supplemental key book belonging to the first digital identity, and (ii) an external key book belonging to a second digital identity.

14. The memory device of claim 13, wherein the supplemental key book belonging to the first digital identity comprises a first manager key book for authorizing the multi-signature transaction based on a first characteristic of the multi-signature transaction and a second manager key book for authorizing the multi-signature transaction based on a second characteristic of the multi-signature transaction.

15. The memory device of claim 13, wherein the external key book belonging to a second digital identity is identified via a uniform resource locator (URL) address.

16. The memory device of claim 13, wherein the external key book belonging to a second digital identity authorizes the multi-signature transaction based on a set of rules of the second digital identity, thereby enabling an off-chain validation of a smart contract.

17. The memory device of claim 13, wherein the at least one key book comprises a primary-layer key book and a secondary-layer key book, and wherein the secondary-layer key book enhances security of the identity-based blockchain account.

18. The memory device of claim 13, wherein the key page is configured to allow replacement of at least one key of the plurality of keys, thereby enabling a dynamic key management.

* * * * *